United States Patent
Lemberger et al.

(10) Patent No.: US 10,594,990 B1
(45) Date of Patent: Mar. 17, 2020

(54) REPORTING CONNECTIVITY PROBLEMS FOR ELECTRONIC DEVICES

(71) Applicant: AMAZON TECHNOLOGIES, INC., Seattle, WA (US)

(72) Inventors: Elliott Lemberger, Santa Monica, CA (US); Joshua Hongpyo Yoon, Los Angeles, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/183,462

(22) Filed: Nov. 7, 2018

(51) Int. Cl.
H04N 7/18 (2006.01)
H04W 4/80 (2018.01)
G08B 13/196 (2006.01)

(52) U.S. Cl.
CPC ....... *H04N 7/186* (2013.01); *G08B 13/19656* (2013.01); *H04W 4/80* (2018.02)

(58) Field of Classification Search
CPC .............................. H04N 7/186; H04W 4/80
See application file for complete search history.

(56) References Cited

U.S. PATENT DOCUMENTS

| | | |
|---|---|---|
| 4,764,953 A | 8/1988 | Chern et al. |
| 5,428,388 A | 6/1995 | Von Bauer et al. |
| 5,760,848 A | 6/1998 | Cho |
| 6,072,402 A | 6/2000 | Kniffin et al. |
| 6,192,257 B1 | 2/2001 | Ray |
| 6,271,752 B1 | 8/2001 | Vaios |
| 6,429,893 B1 | 8/2002 | Xin |
| 6,456,322 B1 | 9/2002 | Marinacci |
| 6,476,858 B1 | 11/2002 | Ramirez Diaz et al. |
| 6,633,231 B1 | 10/2003 | Okamoto et al. |
| 6,658,091 B1 | 12/2003 | Naidoo et al. |

(Continued)

FOREIGN PATENT DOCUMENTS

| | | |
|---|---|---|
| CN | 2585521 Y | 11/2003 |
| CN | 2792061 Y | 6/2006 |

(Continued)

OTHER PUBLICATIONS

U.S. Appl. No. 16/178,509 Office Action dated May 30, 2019, 9 pages.

(Continued)

*Primary Examiner* — Stella L. Woo
(74) *Attorney, Agent, or Firm* — Lathrop GPM LLP

(57) ABSTRACT

Systems and methods provide a notification of a connectivity problem of a video doorbell to a smartphone. A first communication link between the video doorbell and a back-end server is determined unavailable, such as when a password used by the video doorbell to access a local area network (LAN) is not accepted by the LAN. A Bluetooth transceiver of the video doorbell is activated and a Bluetooth signal transmitted from the smartphone is detected. A second communication link between the video doorbell and the smartphone via the Bluetooth transceiver is established and a message is sent to the smartphone, via the Bluetooth transceiver, indicating that the password used by the video doorbell to access the LAN is not accepted by the LAN. The message causes an application running on the smartphone to display a notification on a display of the smartphone indicating the communication problem.

15 Claims, 12 Drawing Sheets

(56) References Cited

U.S. PATENT DOCUMENTS

| | | |
|---|---|---|
| 6,753,774 B2 | 6/2004 | Pan et al. |
| 6,970,183 B1 | 11/2005 | Monroe |
| 7,062,291 B2 | 6/2006 | Ryley et al. |
| 7,065,196 B2 | 6/2006 | Lee |
| 7,085,361 B2 | 6/2006 | Lee |
| 7,109,860 B2 | 9/2006 | Wang |
| 7,193,644 B2 | 3/2007 | Carter |
| 7,304,572 B2 | 12/2007 | Sheynman et al. |
| 7,382,249 B2 | 6/2008 | Fancella |
| 7,450,638 B2 | 11/2008 | Iwamura |
| 7,643,056 B2 | 1/2010 | Silsby |
| 7,683,924 B2 | 3/2010 | Oh et al. |
| 7,683,929 B2 | 3/2010 | Elazar et al. |
| 7,738,917 B2 | 6/2010 | Ryley et al. |
| 8,139,098 B2 | 3/2012 | Carter |
| 8,144,183 B2 | 3/2012 | Carter |
| 8,154,581 B2 | 4/2012 | Carter |
| 8,619,136 B2 | 12/2013 | Howarter et al. |
| 8,780,201 B1 | 7/2014 | Scalisi et al. |
| 8,823,795 B1 | 9/2014 | Scalisi et al. |
| 8,842,180 B1 | 9/2014 | Kasmir et al. |
| 8,872,915 B1 | 10/2014 | Scalisi et al. |
| 8,937,659 B1 | 1/2015 | Scalisi et al. |
| 8,941,736 B1 | 1/2015 | Scalisi |
| 8,947,530 B1 | 2/2015 | Scalisi |
| 8,953,040 B1 | 2/2015 | Scalisi et al. |
| 9,013,575 B2 | 4/2015 | Scalisi |
| 9,049,352 B2 | 6/2015 | Scalisi et al. |
| 9,053,622 B2 | 6/2015 | Scalisi |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Kasmir et al. |
| 9,094,584 B2 | 7/2015 | Scalisi et al. |
| 9,113,051 B1 | 8/2015 | Scalisi |
| 9,113,052 B1 | 8/2015 | Scalisi et al. |
| 9,118,819 B1 | 8/2015 | Scalisi et al. |
| 9,142,214 B2 | 9/2015 | Scalisi |
| 9,160,987 B1 | 10/2015 | Kasmir et al. |
| 9,165,444 B2 | 10/2015 | Scalisi |
| 9,172,920 B1 | 10/2015 | Kasmir et al. |
| 9,172,921 B1 | 10/2015 | Scalisi et al. |
| 9,172,922 B1 | 10/2015 | Kasmir et al. |
| 9,179,107 B1 | 11/2015 | Scalisi et al. |
| 9,179,108 B1 | 11/2015 | Scalisi et al. |
| 9,179,109 B1 | 11/2015 | Kasmir et al. |
| 9,196,133 B2 | 11/2015 | Scalisi et al. |
| 9,197,867 B1 | 11/2015 | Scalisi et al. |
| 9,230,424 B1 | 1/2016 | Scalisi et al. |
| 9,237,318 B2 | 1/2016 | Kasmir et al. |
| 9,247,219 B2 | 1/2016 | Kasmir et al. |
| 9,253,455 B1 | 2/2016 | Harrison et al. |
| 9,342,936 B2 | 5/2016 | Scalisi |
| 9,508,239 B1 | 11/2016 | Harrison et al. |
| 9,736,284 B2 | 8/2017 | Scalisi et al. |
| 9,743,049 B2 | 8/2017 | Scalisi et al. |
| 9,769,435 B2 | 9/2017 | Scalisi et al. |
| 9,786,133 B2 | 10/2017 | Harrison et al. |
| 9,799,183 B2 | 10/2017 | Harrison et al. |
| 2002/0094111 A1 | 7/2002 | Puchek et al. |
| 2002/0147982 A1 | 10/2002 | Naidoo et al. |
| 2003/0043047 A1 | 3/2003 | Braun |
| 2004/0085205 A1 | 5/2004 | Yeh |
| 2004/0085450 A1 | 5/2004 | Stuart |
| 2004/0086093 A1 | 5/2004 | Schranz |
| 2004/0095254 A1 | 5/2004 | Maruszczak |
| 2004/0135686 A1 | 7/2004 | Parker |
| 2005/0111660 A1 | 5/2005 | Hosoda |
| 2006/0010199 A1 | 1/2006 | Brailean et al. |
| 2006/0022816 A1 | 2/2006 | Yukawa |
| 2006/0139449 A1 | 6/2006 | Cheng et al. |
| 2006/0156361 A1 | 7/2006 | Wang et al. |
| 2010/0191608 A1 | 7/2010 | Mikkelsen et al. |
| 2013/0057695 A1 | 3/2013 | Huisking |
| 2015/0035987 A1 | 2/2015 | Fernandez |
| 2016/0227474 A1* | 8/2016 | McRae ................. H04W 48/20 |
| 2018/0103238 A1* | 4/2018 | Wu ......................... G08B 3/10 |
| 2018/0365969 A1* | 12/2018 | Krein ..................... G08B 25/00 |

FOREIGN PATENT DOCUMENTS

| | | |
|---|---|---|
| EP | 0944883 B1 | 6/1998 |
| EP | 1480462 A1 | 11/2004 |
| GB | 2286283 A | 8/1995 |
| GB | 2354394 A | 3/2001 |
| GB | 2357387 A | 6/2001 |
| GB | 2400958 A | 10/2004 |
| JP | 2001-103463 A2 | 4/2001 |
| JP | 2002-033839 A2 | 1/2002 |
| JP | 2002-125059 A2 | 4/2002 |
| JP | 2002-342863 A2 | 11/2002 |
| JP | 2002-344640 A2 | 11/2002 |
| JP | 2002-354137 A2 | 12/2002 |
| JP | 2002-368890 A2 | 12/2002 |
| JP | 2003-283696 A2 | 10/2003 |
| JP | 2004-128835 A | 4/2004 |
| JP | 2005-341040 A | 12/2005 |
| JP | 2006-147650 A | 6/2006 |
| JP | 2006-262342 A | 9/2006 |
| JP | 09-008925 A | 1/2009 |
| WO | WO 199839894 A1 | 9/1998 |
| WO | WO 0113638 A1 | 2/2001 |
| WO | WO 200193220 A1 | 12/2001 |
| WO | WO 2002085019 A1 | 10/2002 |
| WO | WO 2003028375 A1 | 4/2003 |
| WO | WO 2003096696 A1 | 11/2003 |
| WO | WO 2006038760 A1 | 4/2006 |
| WO | WO 2006067782 A1 | 6/2006 |
| WO | WO 2007125143 A1 | 8/2007 |

OTHER PUBLICATIONS

U.S. Appl. No. 16/178,509 final Office Action dated Dec. 5, 2019, 11 pages.

* cited by examiner

REPORTING CONNECTIVITY PROBLEMS FOR ELECTRONIC DEVICES

TECHNICAL FIELD

The present embodiments relate to audio/video (A/V) recording and communication devices, including A/V recording and communication doorbells, security cameras, and floodlight controllers. In particular, the present embodiments relate to improvements in the functionality of A/V recording and communication devices that strengthen the ability of such devices to reduce crime and enhance public safety.

BACKGROUND

Home security is a concern for many homeowners and renters. Those seeking to protect or monitor their homes often wish to have video and audio communications with visitors, for example, those visiting an external door or entryway. A/V recording and communication devices, such as doorbells, provide this functionality, and can also aid in crime detection and prevention. For example, audio and/or video captured by an A/V recording and communication device can be uploaded to the cloud and recorded on a remote server. Subsequent review of the A/V footage can aid law enforcement in capturing perpetrators of home burglaries and other crimes. Further, the presence of one or more A/V recording and communication devices on the exterior of a home, such as a doorbell unit at the entrance to the home, acts as a powerful deterrent against would-be burglars.

BRIEF DESCRIPTION OF THE DRAWINGS

The various embodiments of the present reporting connectivity problems for electronic devices now will be discussed in detail with an emphasis on highlighting the advantageous features. These embodiments depict the novel and non-obvious reporting connectivity problems for electronic devices shown in the accompanying drawings, which are for illustrative purposes only. These drawings include the following figures, in which like numerals indicate like parts.

DETAILED DESCRIPTION

Figure 1A:
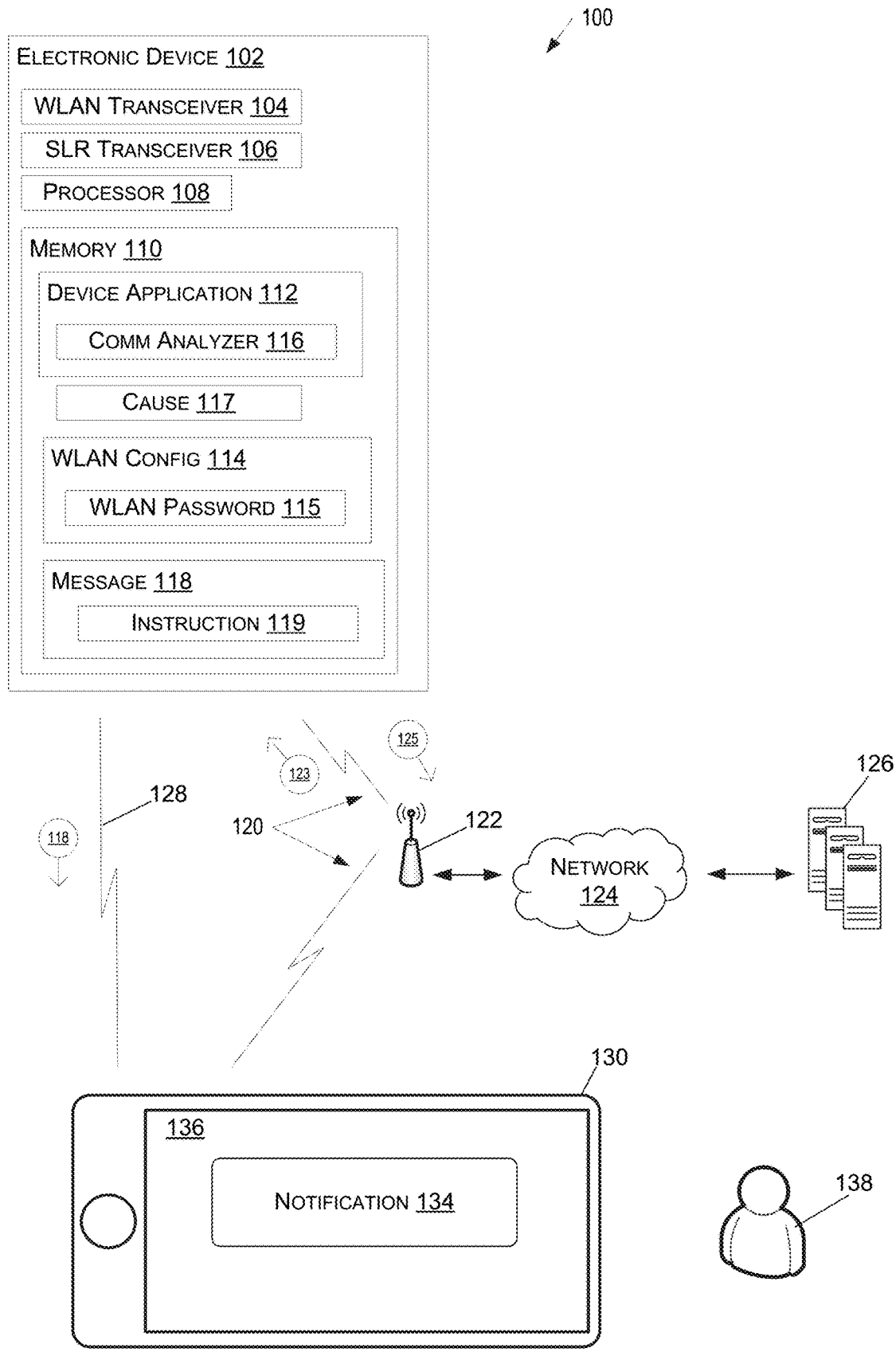
FIG. 1A is a schematic diagram of an example system for reporting connectivity problems for electronic devices, according to various aspects of the present disclosure.

An electronic device, such as an Internet-of-Things (IoT) device (e.g., a video doorbell, a security camera, or a smart appliance), may include both a short-link radio (SLR) transceiver (e.g., a Bluetooth transceiver) and a wireless local area network (WLAN) transceiver. During installation of the electronic device, a client device (e.g., a smartphone, tablet computer, laptop computer, etc.) may connect to the electronic device via the SLR transceiver to configure the WLAN transceiver for communication with a WLAN at the installation site. The client device may run an application that facilitates connection to, and configuration of, the electronic device via the SLR transceiver of the electronic device. For example, the client device may communicatively couple with the electronic device via the SLR transceiver and transfer WLAN connection parameters (e.g., SSID, password, etc.) to the electronic device. Once configured with the WLAN connection parameters, the electronic device may control the WLAN transceiver to connect to the WLAN, for example to enable communication with a remote server via the WLAN and the Internet. The WLAN may allow the electronic device to communicate with the remote server via one or more networks, including the Internet via an Internet service provider (ISP). When configured with the WLAN connection parameters, the electronic device may establish communication with the remote server and then disable the SLR transceiver.

When communication between the electronic device and the remote server subsequently fails, such as when the remote server becomes unavailable, when the Internet connection (ISP) of the WLAN fails, and/or when the electronic device is unable to connect to the WLAN because of configuration changes to the WLAN (e.g., when the password of the WLAN is changed), the electronic device is no longer able to communicate via the WLAN and cannot report the communication failure. Accordingly, the communication problem persists until noticed by a user and resolved. Most IoT devices rely upon the WLAN for communication and become communicatively isolated when communication via the WLAN is unavailable. Even where the remote server is able to detect when communication from the electronic device stops, such as by detecting when no messages or responses have been received from the electronic device over a certain interval of time, such detection methods are unreliable and delayed, often resulting in incorrect reporting of network connectivity errors.

The remaining detailed description describes the present embodiments with reference to the drawings. In the drawings, reference numbers label elements of the present embodiments. These reference numbers are reproduced below in connection with the discussion of the corresponding drawing features.

One aspect of the present embodiments includes the realization that an electronic device may be configured, using a short-link radio, to connect to a WLAN, and that the electronic device may thereafter disable the short-link radio and rely upon the WLAN for communication. However, when the WLAN is unavailable, the electronic device often becomes communicatively isolated and unable to report the connectivity problem. The present embodiments solve this problem by detecting when communication over the WLAN is unavailable, re-enabling the short-link radio, and sending a message indicating the communication problem to a client device when it is in range of the electronic device. Advantageously, this process of re-enabling the short-range radio further enables the client device, when informed of the communication problem, to evaluate the WLAN and automatically correct the communication problem when the WLAN password used by the electronic device is not accepted by the WLAN.

Another aspect of the present embodiments includes the realization that when the electronic device is unable to communicate via the WLAN, the communication problem may remain unnoticed. The present embodiments solve this problem by informing the client device of the communication problem at the earliest opportunity when the client device comes into range of the short-link radio. Advantageously, this process of re-enabling the short-range radio further enables the client device to notify the client device user of the communication problem such that the user may remedy the problem.

Another aspect of the present embodiments includes the realization that when an electronic device is auto-provisioned from a repeater access point (AP), the electronic device is configured to only access the repeater WLAN (e.g., the WLAN supported by the repeater AP). When the repeater AP fails (e.g., gets unplugged), the electronic device is unable to connect to the repeater WLAN, and thus loses connectivity to a remote server via the Internet, for example. The present embodiments solve this problem by configuring the electronic device with both a repeater WLAN configuration and a base WLAN configuration, during the auto-provisioning of the electronic device to access the repeater WLAN, where the base WLAN configuration defines access requirements for a base WLAN to which the repeater AP connects and "extends." The electronic device may be configured with a communication monitor that detects when the repeater WLAN is unavailable, and automatically configures the electronic device to connect to the base WLAN using the base WLAN configuration. Advantageously, when the repeater WLAN fails (e.g., when the repeater AP is unplugged), the electronic device may automatically connect to the base WLAN and thereby maintain connectivity to the remote server via the Internet. A further advantage of this aspect is that when the repeater WLAN recovers (e.g., when the repeater AP is plugged back in), the electronic device may automatically reconnect to the repeater WLAN.

FIG. 1A is a schematic diagram of an example system 100 for reporting connectivity problems for electronic devices, according to various aspects of the present disclosure. The system 100 indicates when an electronic device 102 is unable to communicate. The electronic device 102 may represent one or more of an IoT device, a security device, a video doorbell, a security camera, a Wi-Fi connected smart appliance, and the like. The electronic device 102 may include a wireless local area network (WLAN) transceiver 104, a short-link radio (SLR) transceiver 106, a processor 108 communicatively coupled with both of the WLAN transceiver 104 and the SLR transceiver 106, and a memory 110 communicatively coupled with the processor 108. The memory 110 stores a device application 112 including machine readable instructions (e.g., software and/or firmware) executable by the processor 108 to implement logic and functionality of the electronic device 102 according to the embodiments described herein.

Figure 1B:
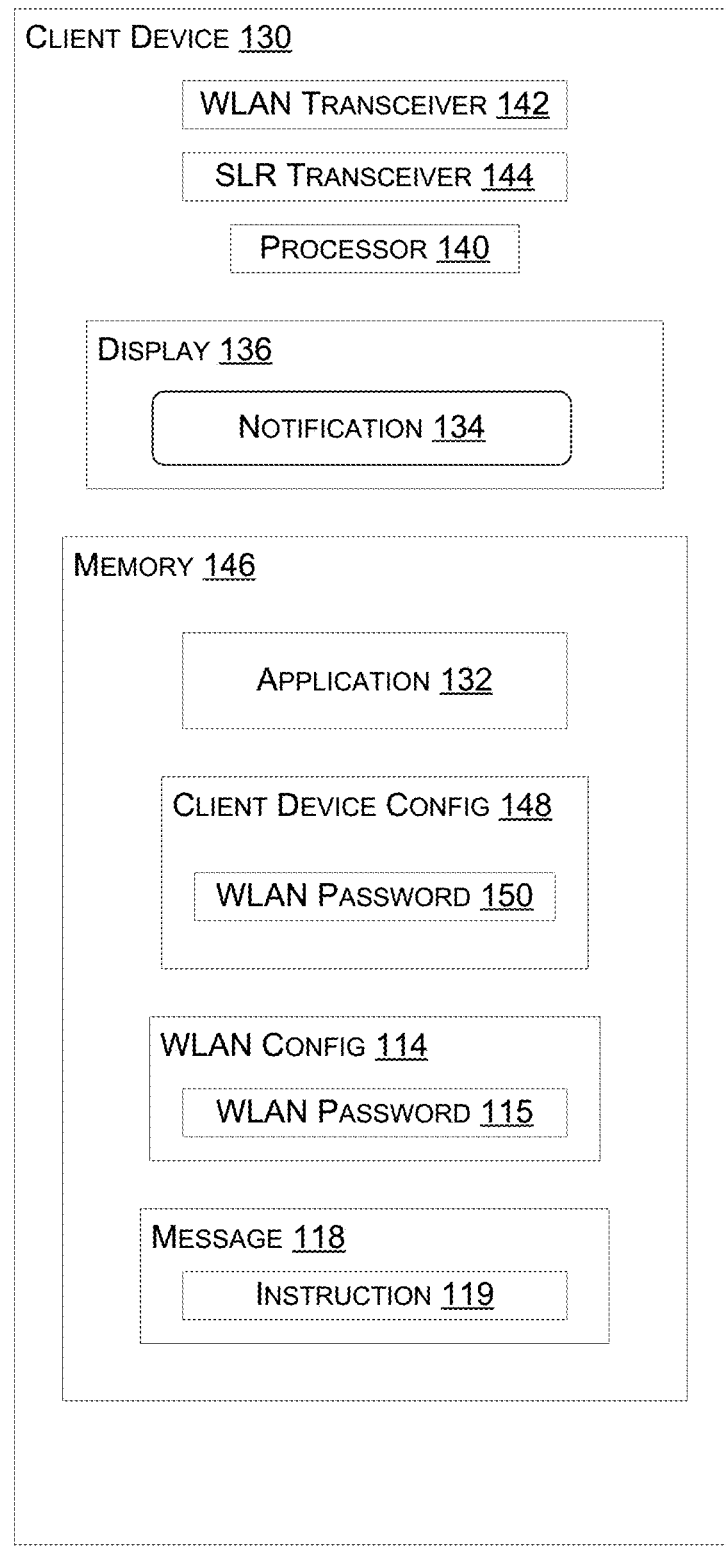
FIG. 1B is a functional block diagram illustrating the client device of FIG. 1A in further detail.

A WLAN 120, implemented by a WLAN hub 122 (e.g., a Wi-Fi access point and/or a Wi-Fi router), may provide wireless connectivity to a remote server 126 via a network 124 (e.g., the Internet). On the electronic device 102, the device application 112 may, through the processor 108, control the WLAN transceiver 104 to connect to the WLAN 120 using a WLAN configuration 114. The WLAN configuration 114 may define a WLAN password 115 and other parameters (e.g., a service set identifier (SSID), encryption information, and so on) that allows the electronic device 102 to identify and connect to the WLAN 120. Where the electronic device 102 includes a user interface, the WLAN configuration 114 may be entered directly by the user. However, when the electronic device 102 does not include a user interface capable of input of the WLAN configuration 114 (e.g., the electronic device 102 is "headless"), an authorized person (e.g., an owner) 138 may use a client device 130 (e.g., a mobile communication device such as a smartphone, laptop computer, etc.) to auto-provision (e.g., connect to and configure) the electronic device 102 to access the WLAN 120. The electronic device 102 may be auto-provisioned using other methods without departing from the scope of the embodiments described herein. FIG. 1B shows the client device 130 of FIG. 1A in further detail. FIGS. 1A and 1B are best viewed together with the following description.

As shown, the client device 130 may run an application 132 that establishes an SLR connection 128 between the client device 130 and the electronic device 102 (e.g., via the SLR transceiver 106 of the electronic device 102 and a WLAN transceiver 142 of the client device 130). The application 132 may allow the authorized person 138 to interactively select the WLAN 120 from WLANs detected and/or indicated by the client device 130. For the selected WLAN, the application 132 may allow the authorized person 138 to enter a WLAN password 115, or the application 132 may use a WLAN password 150 of a client device configuration 148 where the client device 130 is configured to connect to the selected WLAN. The application 132 may then generate and send the WLAN configuration 114, including the WLAN password 115, to the electronic device 102.

Once the electronic device 102 has received the WLAN configuration 114, the device application 112 uses the WLAN configuration 114 to control the WLAN transceiver 104 and connect to the WLAN 120. Once the communication with the remote server 126 is established via the WLAN hub 122 and the network 124, the electronic device 102 may deactivate the SLR transceiver 106.

In this manner, the electronic device 102 may communicate only via the WLAN 120, particularly where the electronic device 102 has little or no user interface, and/or is located away from areas frequented by the authorized person 138. But when the communication link between the electronic device 102 and the remote server 126 is unavailable, the electronic device 102 may be unable to operate correctly. For example, where the electronic device 102 is a video doorbell, and when the communication link to the remote server 126 is unavailable, the video doorbell cannot stream captured video and/or audio to the remote server 126. The communication link between the electronic device 102 and the remote server 126 may also become unavailable when the connection between the WLAN hub 122 and the network 124 is unavailable (e.g., when the WLAN hub 122 cannot connect to the Internet), and/or when the electronic device 102 cannot connect to the WLAN 120. For example, when the WLAN hub 122 is unplugged, and/or when a network password of the WLAN 120 (e.g., at the WLAN hub 122) is updated by the authorized person 138, but not updated within the electronic device 102, the electronic device 102 cannot connect to the WLAN 120. However, since the electronic device 102 cannot communicate with the remote server 126, the remote server 126 may be unaware of the communication problem, and cannot notify the authorized person 138 of the communication problem. Without the communication link to the remote server 126, the electronic device 102 may become communicatively isolated.

Accordingly, the device application 112 includes a communication analyzer 116 that determines when the communication link between the electronic device 102 and the remote server 126 is unavailable. The communication analyzer 116, for example, determines that the communication link is unavailable when an error message 123 is received at the electronic device 102 from the WLAN hub 122 and/or when a message 125 sent from the electronic device 102 to the remote server 126 is not acknowledged by the remote server 126. In another example, the communication analyzer 116 may determine that the communication between the electronic device 102 and the remote server 126 is unavailable because there are no received acknowledgements, from the remote server 126, of status messages routinely transmitted (e.g., every thirty seconds) to the remote server 126. In another example, the communication analyzer 116 may interact with the wireless hub 122 and learn that the WLAN 120 has no Internet connection. When the communication analyzer 116 determines that the communication link is unavailable, the communication analyzer 116 may activate the SLR transceiver 106 to allow the SLR connection 128 to be reestablished when the client device 130 is near to the electronic device 102.

When the authorized person 138 carries the client device 130 and frequents the location of the electronic device 102, such as when the electronic device 102 is located at a home of the authorized person 138 and the client device 130 is a smartphone carried by the authorized person 138, the client device 130 may often be in communication range of the SLR transceiver 106. Accordingly, when the communication link between the electronic device 102 and the remote server 126 is operational, the SLR transceiver 106 is not operating and therefore the SLR connection 128 is not active. However, when the communication analyzer 116 detects the communication problem, the SLR transceiver 106 is activated. Then, when in range, the client device 130 may automatically establish the SLR connection 128 with the electronic device 102. For example, where the SLR connection 128 is Bluetooth, and the client device 130 and the electronic device 102 were previously paired to configure the electronic device 102 for connection to the WLAN 120, but now the connection to the WLAN 120 is unavailable, the client device 130 may instead automatically connect to the electronic device 102 when the client device 130 comes into Bluetooth wireless range of the SLR transceiver 106.

In operation, the communication analyzer 116 detects the SLR connection 128, generates a message 118 indicating the communication problem (e.g., the unavailability of the communication link with the WLAN 120), and sends the message 118 to the client device 130. The application 132 running on the client device 130 receives the message 118 and displays a notification 134 of the communication problem on a display 136 of the client device 130. Thus, the communication problem is automatically brought to the attention of the authorized person 138. In particular, where enabled on the client device 130, the notification 134 may cause a sound and/or have an accompanying vibration to bring the notification 134 immediately to the attention of the authorized person 138 as soon as the client device 130 is in range of the electronic device 102. For example, where the electronic device 102 is a video doorbell, as the authorized person 138 returns home and approaches a door where the video doorbell is located, the authorized person 138 advantageously receives the notification 134 immediately upon approach to the doorway.

When the communication problem is detected, the communication analyzer 116 may determine a cause 117 of the communication problem. For example, where the error message 123 from the WLAN hub 122 indicates a password error, the communication analyzer 116 may set the cause 117 to represent "WLAN password error." The communication analyzer 116 may set an instruction 119 in the message 118 to direct the application 132 of the client device 130 to display the notification 134 with the cause 117 of the communication problem, such as "WLAN password error." Accordingly, the authorized person 138 is made aware that the WLAN password used by the electronic device 102 does not match the password set within the WLAN hub 122. For example, the authorized person 138 may have changed the WLAN password at the WLAN hub 122, but forgot to change the corresponding WLAN password within the electronic device 102, thereby preventing the electronic device 102 from connecting to the WLAN 120. Alternatively, if the authorized person 138 has not changed the WLAN password in the WLAN hub 122, the authorized person 138 is made aware that someone else has changed it.

In another example, where the device application 112 sends a message to the remote server 126, and the remote server 126 fails to respond and/or acknowledge the message, the communication analyzer 116 may, using a timer for example, detect the missing response and/or acknowledgment from the remote server 126 and determine the cause 117 as "WLAN network error." The communication analyzer 116 may set the instruction 119 in the message 118 to direct the application 132 of the client device 130 to display the notification 134 to indicate the cause 117 of the communication problem as "WLAN network error." Accordingly, the authorized person 138 is made aware that the WLAN hub 122, the network 124, and/or the remote server 126, is causing the communication problem for the electronic device 102.

Without the notification 134 on the client device 130, the authorized person 138 may be unaware of the communication problem with the electronic device 102 until the communication problem causes other more noticeable issues and/or problems for the authorized person 138. Thus, advantageously, the notification 134 displayed on the client device 130 allows the authorized person 138 to quickly learn about, investigate, and then resolve the communication problem of the electronic device 102. For example, where the notification 134 indicates "WLAN password error," the authorized person 138 may use the client device 130 to update the password for the electronic device 102. In another example, where the notification 134 indicates "WLAN network error," the authorized person 138 may evaluate other devices (e.g., the client device 130) connected with the WLAN hub 122 to determine the cause of the network error, or even restart the WLAN hub 122 if needed.

In certain embodiments, and in response to receiving the message 118, the application 132 running on the client device 130 may automatically (e.g., without user interaction) attempt to evaluate and/or resolve the communication problem indicated by the electronic device 102. For example, when the message 118 and/or the instruction 119 indicates "WLAN password error," the application 132 may first determine whether the client device 130 can connect (or is connected) to the WLAN 120 using a WLAN password 150 stored in the memory 146, and when the client device 130 is able to connect (or is connected) to the WLAN 120, the application 132 may transfer the WLAN password 150 from the client device 130 to the electronic device 102 via the SLR connection 128. Thus, the communication error of the electronic device 102 may be automatically corrected by the application 132 of the client device 130. In certain embodiments, the application 132 may send the WLAN password 150 to the electronic device 102 only when the client device 130 was previously used to configure the electronic device 102, such as by verifying that the electronic device 102 matches the WLAN configuration 114 stored in the memory 146. Accordingly, the application 132 may update the WLAN password 115 of the WLAN configuration 114 with the WLAN password 150.

In certain embodiments, when the communication analyzer 116 determines that the communication problem has been resolved, such as by detecting that the electronic device 102 connects to the WLAN 120 and that the remote server 126 acknowledges messages sent from the electronic device 102 to the remote server 126, the communication analyzer 116 deactivates the SLR transceiver 106.

Advantageously, by detecting the communication problem, the communication analyzer 116 may automatically switch the electronic device 102 into a configuration mode that allows the authorized person 138 to correct the WLAN password 115, thereby avoiding any need for the authorized person 138 to manually set the electronic device 102 into the configuration mode.

Figure 1C:
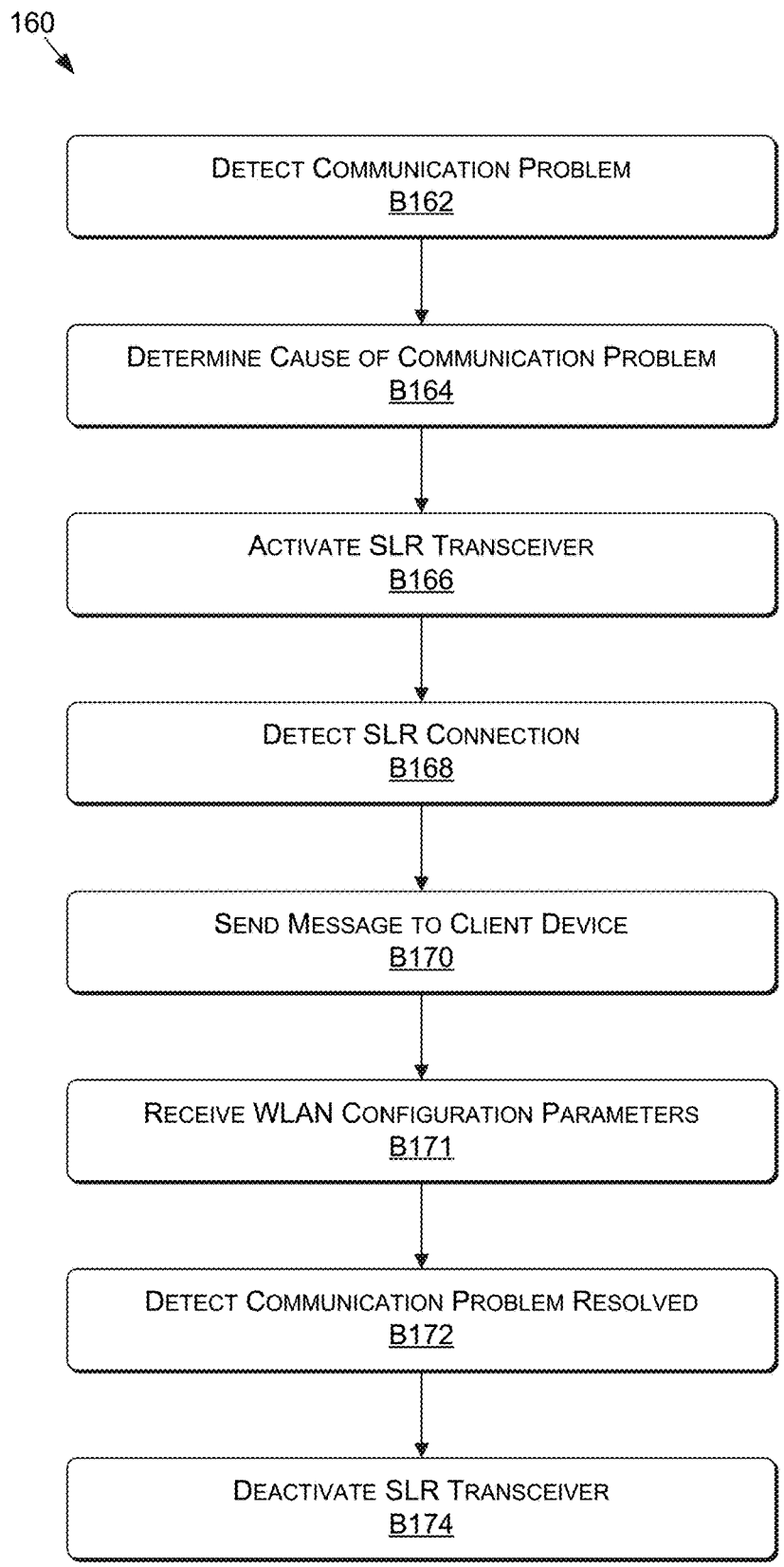
FIGS. 1C and 1D are flowcharts illustrating example methods for reporting connectivity problems for electronic devices, according to various aspects of the present disclosure.

FIG. 1C illustrates an example method for reporting connectivity problems for electronic devices, according to various aspects of the present disclosure. In particular, FIG. 1C shows one method 160 that may, for example, be implemented within the communication analyzer 116 of the electronic device 102. In block B162, a communication problem between the electronic device 102 and the WLAN hub 122, or between the electronic device 102 and the remote server 126, is detected. In one example of block B162, the communication analyzer 116 receives the error message 123 from the WLAN hub 122. In another example of block B162, the communication analyzer 116 may determine that the communication between the electronic device 102 and the remote server 126 is unavailable because there are no received acknowledgements, from the remote server 126, of status messages routinely transmitted (e.g., every thirty seconds) to the remote server 126. En block B164, a cause of the communication problem is determined. In one example of block B164, the communication analyzer 116 determines, from the error message 123, that the WLAN password is invalid. In another example of block B164, the device application 112 may interact with the WLAN hub 122 and learn that the WLAN 120 has no Internet connection. In block B166, the SLR transceiver is activated. In one example of block B166, the communication analyzer 116 activates the SLR transceiver 106.

In block B168, the SLR connection is detected. In one example of block B168, the communication analyzer 116 detects when the SLR connection 128 is formed between the electronic device 102 and the client device 130. In block B170, a message is sent to the client device. In one example of block B170, the communication analyzer 116 sends the message 118 to the client device 130 via the SLR connection 128.

In block B171, WLAN configuration parameters are received. Block B171 may be, for example, included when the client device 130 determines that the configuration parameters of the WLAN (e.g., the password) has changed, and sends updated parameters to the electronic device 102.

In block B172, resolution of the communication problem is detected. In one example of block B172, the communication analyzer 116 detects at least one of (a) when the WLAN transceiver 104 can connect to the WLAN 120, (b) when messages are received from the remote server 126, and/or (c) when messages 125 are acknowledged by the remote server 126.

In block B174, the SLR transceiver is deactivated. In one example of block 174, the communication analyzer 116 deactivates the SLR transceiver 106 when the communication problem is resolved. The method 160 may return to block B162 and detect and generate notifications for future communication problems.

Figure 1D:
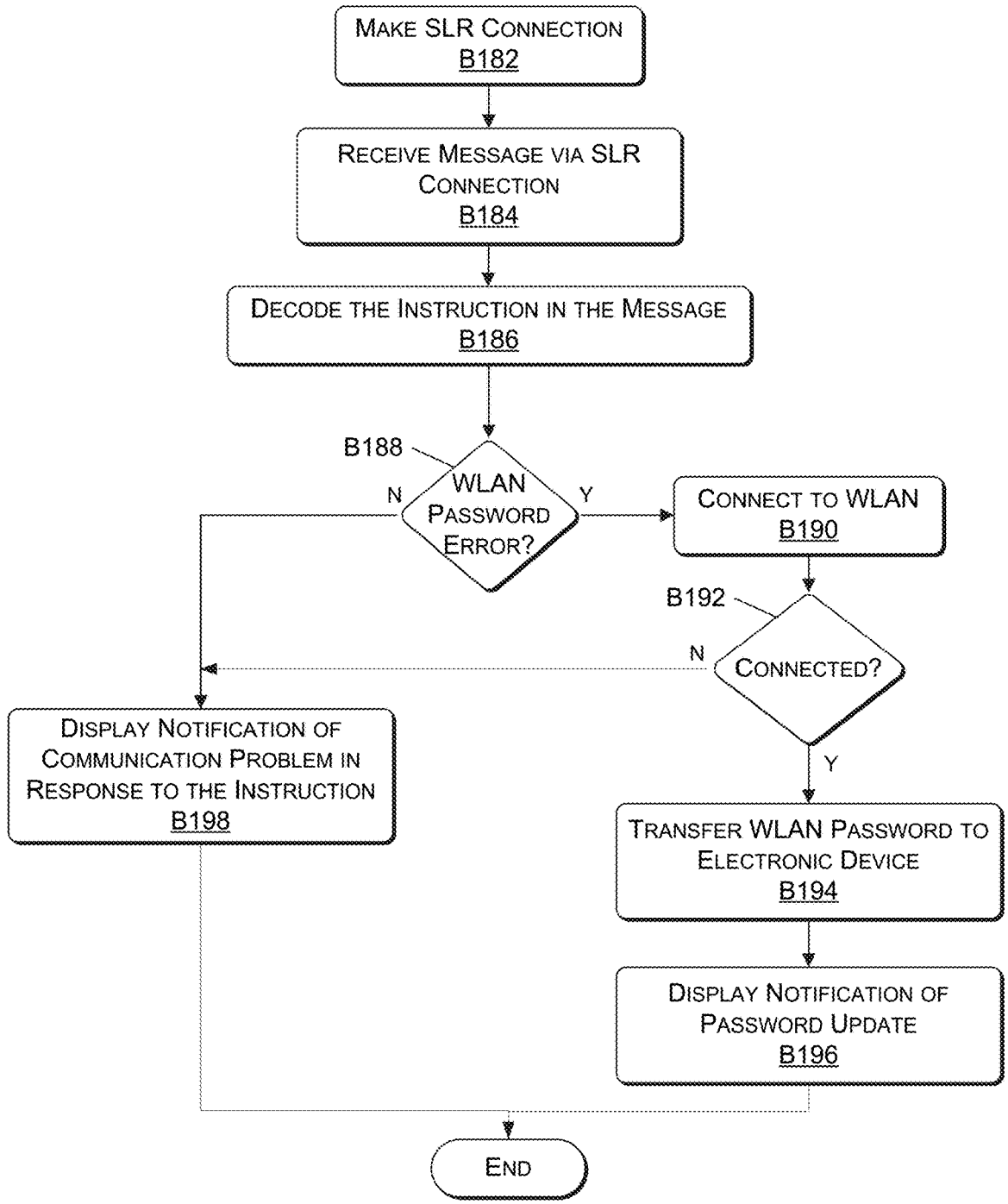

FIG. 1D illustrates another example method 180 for reporting connectivity problems for electronic devices, according to various aspects of the present disclosure. In block B182, an SLR connection is made. In one example of block B182, the SLR transceiver 144 of the client device 130 automatically connects to the SLR transceiver 106 of the electronic device 102 to form the SLR connection 128 when the client device 130 is in range of the SLR transceiver 106. In various embodiments, block B182 may occur after block B166 of the method 160 illustrated in FIG. 1C.

In block B184, a message is received via the SLR connection. In one example of block B184, the client device 130 receives the message 118 from the electronic device 102 via the SLR connection 128. In block B186, the instruction in the message is decoded. In one example of block B186, the application 132 decodes the instruction 119 from the message 118. Block B188 is a decision. If, in block B188, it is determined that the message and/or the instruction indicates a WLAN password error, the method 180 continues with block B190; otherwise, the method 180 continues with block B198.

In block B190, the client device 130 connects to the WLAN. In one example of block B190, unless already connected, the application 132 controls the WLAN transceiver 142 to connect to the WLAN hub 122 using client device configuration 148, and in particular the WLAN password 150. Block B192 is a decision. If, in block B192, it is determined that the client device 130 is connected to the WLAN 120, the method 180 continues with block B194; otherwise, the method 180 continues with block B198.

In block B194, the WLAN password is transferred from the client device to the electronic device. In one example of block B194, the application 132 transfers the WLAN password 150 to the electronic device 102. In block B196, a notification of the password update is displayed. In one example of block B196, the application 132 displays the notification 134 indicating that the WLAN password of the electronic device 102 has been updated by the client device 130. The method 180 then terminates.

In block B198, a notification of the communication problem is displayed in response to the instruction. In one example of block B198, the application 132, in response to the instruction 119, generates the notification 134 to indicate the communication problem and/or the cause of the communication problem.

Dual Auto-Provisioning of an Electronic Device

Figure 1E:
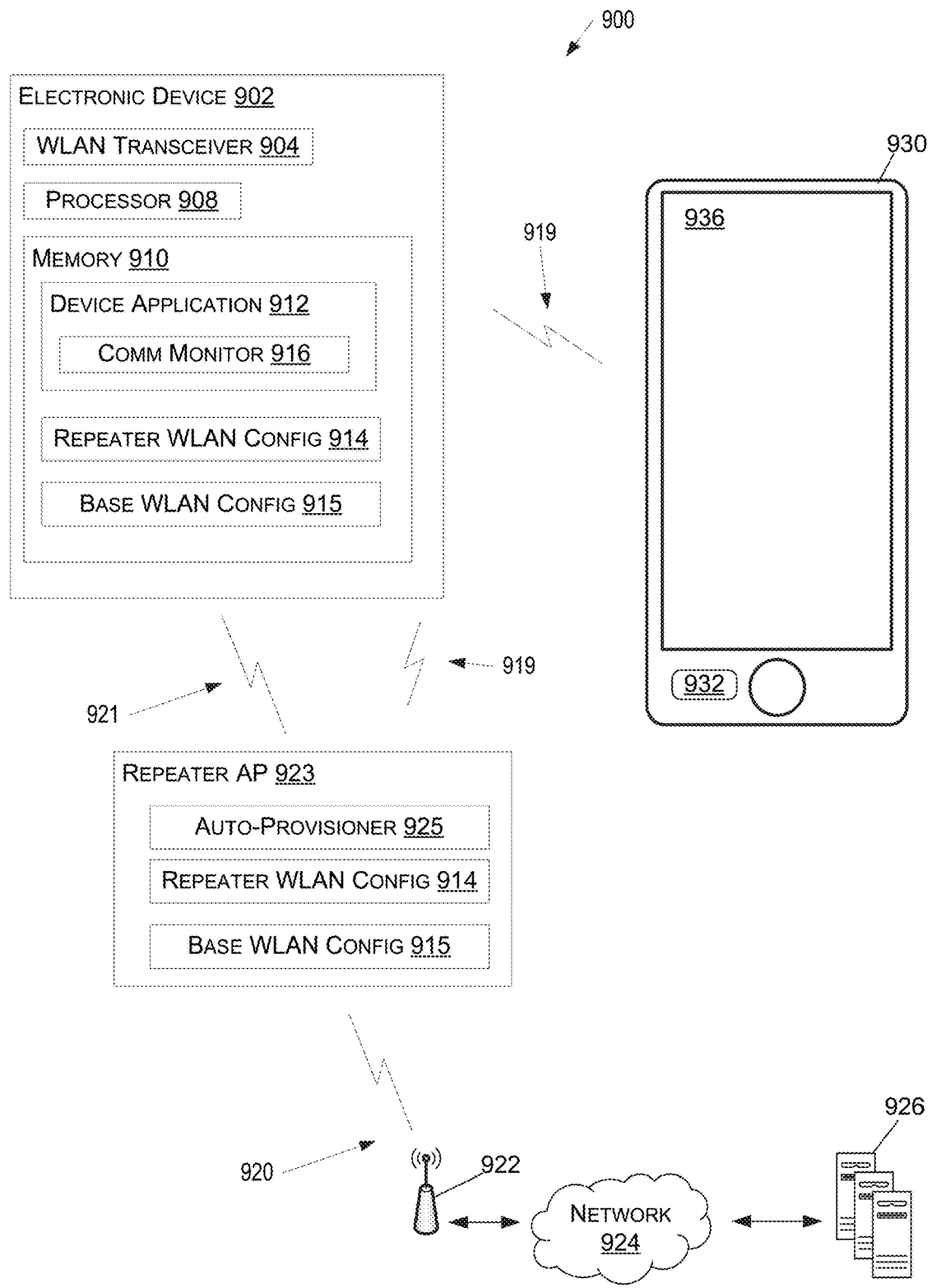
FIG. 1E is a schematic diagram of a system that auto-provisions an electronic device to connect to a wireless network repeating device and a wireless router of the wireless network, according to various aspects of the present disclosure.

FIG. 1E is a schematic diagram of an example system 900 that auto-provisions an electronic device 902, according to various aspects of the present disclosure. The electronic device 902 may be, for example, an Internet-of-Things (IoT) device that has no user interface (e.g., headless), thereby requiring configuration through other devices. The electronic device 902 may include a WLAN transceiver 904, a processor 908, and a memory 910 that communicatively couples with the processor 908. The memory 910 stores a device application 912 with machine readable instructions executable by the processor 908 to implement the functionality of the electronic device 902 according to the embodiments described herein. Although shown as separate embodiments, the electronic device 102 of FIG. 1A and the electronic device 902 of FIG. 1E may be combined, in certain embodiments, such that the combined electronic device includes components and/or functionality of both the electronic device 102 and the electronic device 902.

In the example of FIG. 1E, a base access point (AP) 922 (e.g., a wireless router) connects to a network 924 (e.g., the Internet), which in turn connects to a remote server 926. The base AP 922 may be, for example, located at a site where the electronic device 902 is installed, and may generate a base WLAN 920. A repeater AP 923 is also configured at the site to generate a repeater WLAN 921 that extends the range of the base WLAN 920. Accordingly, the repeater AP 923 is configured with a base WLAN configuration 915 that defines at least an SSID and a password used to connect to the base WLAN 920. The repeater AP 923 also stores a repeater WLAN configuration 914 that defines access control to the repeater WLAN 921, for example including an SSID and a password of the repeater WLAN 921.

Based on the location of the electronic device 902 with respect to the repeater AP 923 and the base AP 922, it may be preferable for the electronic device 902 to connect to the repeater WLAN 921 instead of the base WLAN 920 (e.g., when the signal strength of the repeater WLAN 921 detected by the electronic device 902 is greater than the signal strength of the base WLAN 920). The electronic device 902 may, therefore, be auto-provisioned with the repeater WLAN configuration 914, by the repeater AP 923, for example.

Auto-provisioning is conventionally achieved using one of several different methods. In one example of auto-provisioning, the electronic device 902 may initially (e.g., when not yet configured to connect to the repeater LAN 921) act as an AP, creating a temporary device WLAN 919. Under direction of the user interacting with a display 936 of the client device 930, the client device 930 may connect to the temporary device WLAN 919 and the application 932 may then transfer the repeater WLAN configuration 914 to the electronic device 902. In another example of auto-provisioning, under control of the user interacting with the display 936 of the client device 930, the application 932 may instruct an auto-provisioner 925 (e.g., implemented within firmware) of the wireless repeater AP 923 to connect to the temporary device WLAN 919 and auto-provision the electronic device 902 with the repeater WLAN configuration 914. In another example of auto-provisioning, the user may initiate push-button provisioning by pressing a button on the repeater AP 923 that initiates a temporary (e.g., two-minute duration) open connection mode that allows the electronic device 902 to connect to the repeater WLAN 921 for auto-provisioning, and to receive the repeater WLAN configuration 914 from the repeater AP 923. The electronic device 902 then uses the repeater WLAN configuration 914 to connect to the repeater WLAN 921.

One drawback of auto-provisioning the electronic device 902 is that, when the repeater WLAN 921 is unavailable (e.g., when the repeater AP 923 is disconnected, unplugged, etc.) but the base WLAN 920 is still operational, the electronic device 902 cannot connect to the remote server 926 and becomes communicatively isolated. The current embodiments solve this problem by improving the auto-provisioner 925 to configure the electronic device 902 with both the repeater WLAN configuration 914 and the base WLAN configuration 915. Accordingly, a communication monitor 916 within the device application 912 may determine when the repeater WLAN 921 is unavailable, and then automatically control the WLAN transceiver 904 to connect to the base WLAN 920. Advantageously, this improved auto-provisioning process allows the electronic device 902 to automatically connect to the base WLAN 920 when the repeater WLAN 921 is unavailable, such that the electronic device 902 maintains connectivity to the remote server 926.

Figure 2:
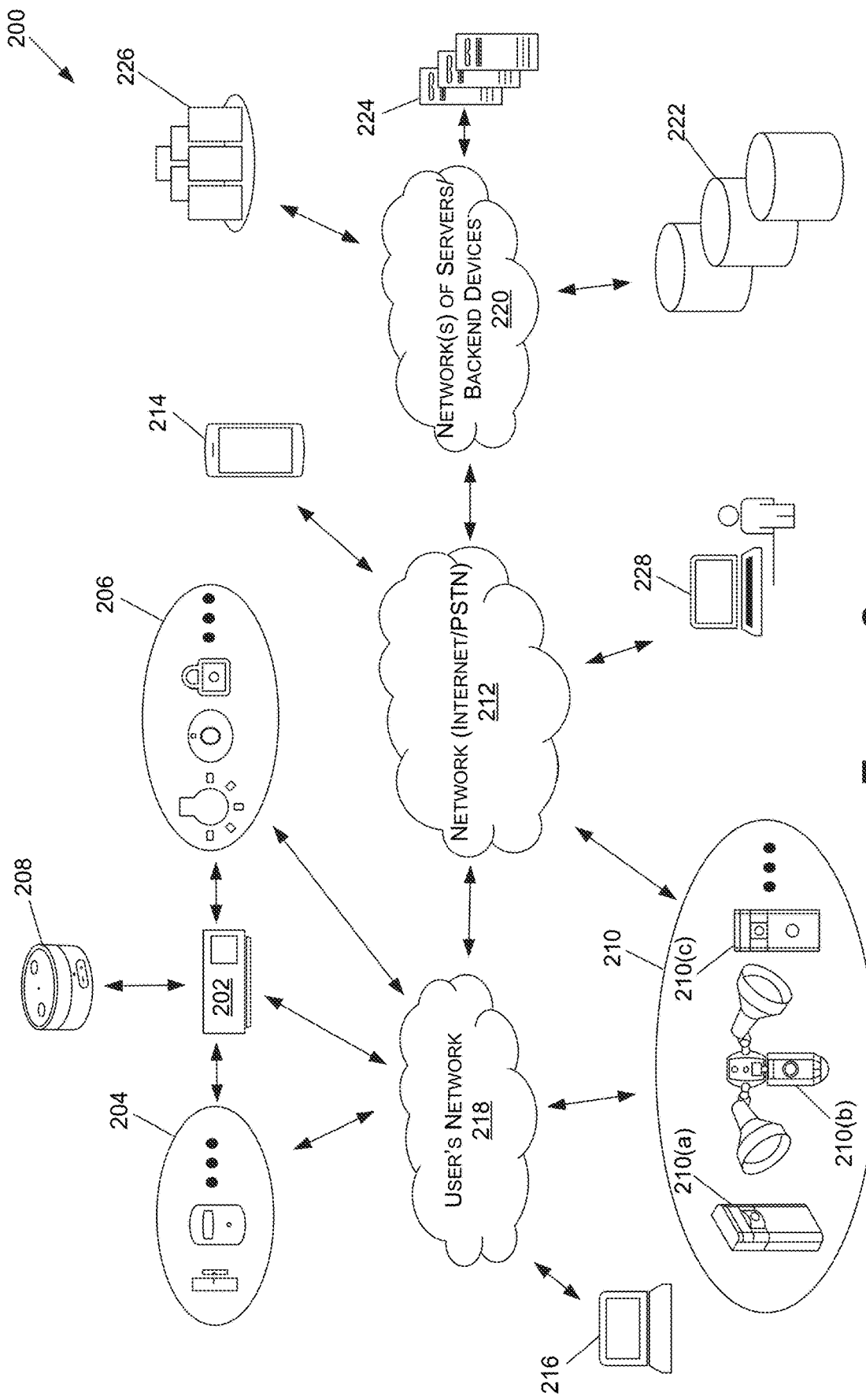
FIG. 2 is a functional block diagram illustrating a system for communicating in a network according to various aspects of the present disclosure.

FIG. 2 is a functional block diagram illustrating a system 200 for communicating in a network according to various aspects of the present disclosure. Home automation, or smart home, is building automation for the home. Home automation enable users (e.g., home owners and authorized individuals) to control and/or automate various devices and/or systems, such as lighting, heating (e.g., smart thermostats), ventilation, home entertainment, air conditioning (HVAC), blinds/shades, security devices (e.g., contact sensors, smoke/CO detectors, motion sensors, etc.), washers/dryers, ovens, refrigerators/freezers, and/or other network connected devices suitable for use in the home. In various embodiments, Wi-Fi is used for remote monitoring and control of such devices and/or systems. Smart home devices (e.g., hub devices 202, sensors 204, automation devices 206, a virtual assistant (VA) device 208, Audio/Video (A/V) recording and communication devices 210, etc.), when remotely monitored and controlled via a network (Internet/a public switched telephone network (PSTN)) 212 (which may be similar to, and represent the network 124 of FIG. 1A), may be considered to be components of the "Internet of Things." Smart home systems may include switches and/or sensors (e.g., the sensors 204) connected to a central hub such as the smart-home hub device 202 and/or the VA device 208 (the hub device 202 and/or the VA device 208 may alternatively be referred to as a gateway, a controller, a home-automation hub, or an intelligent personal assistance device) from which the system may be controlled through various user interfaces, such as voice commands and/or a touchscreen. Various examples, of user interfaces may include any or all of a wall-mounted terminal (e.g., a keypad, a touchscreen, etc.), software installed on the client devices 214, 216 (e.g., a mobile application), a tablet computer, or a web interface. Furthermore, these user interfaces are often but not always supported by Internet cloud services. In one example, the Internet cloud services are responsible for obtaining user input via the user interfaces (e.g., a user interface of the hub device 202 and/or the VA device 208) and causing the smart home devices (e.g., the sensors 204, the automation devices 206, etc.) to perform an operation in response to the user input.

The hub device 202, the VA device 208, the sensors 204, the automation devices 206, the A/V recording and communication devices 210, and/or client devices 214, 216 may use one or more wired and/or wireless communication protocols to communicate, including, for example and without limitation, Wi-Fi (e.g., the user's network 218), X10, Ethernet, RS-485, 6LoWPAN, Bluetooth LE (BLE), ZigBee, Z-Wave, and/or a low power wide-area networks (LPWAN), such as a chirp spread spectrum (CSS) modulation technology network (e.g., LoRaWAN), an Ultra Narrow Band modulation technology network (e.g., Sigfox, Telensa, NB-IoT, etc.), RingNet, and/or the like.

The user's network 218 may be, for example, a wired and/or wireless network. If the user's network 218 is wireless, or includes a wireless component, the user's network 218 may be a Wi-Fi network compatible with the IEEE 802.11 standard and/or other wireless communication standard(s). Furthermore, the user's network 218 may be connected to other networks such as the network 212, which may comprise, for example, the Internet and/or PSTN.

The system 200 may include one or more A/V recording and communication devices 210 (alternatively be referred to herein as "A/V devices 210" or "A/V device 210") (which may include similar components and/or functionality to the electronic device 102 of FIG. 1A and/or the electronic device 902 of FIG. 1E). The electronic devices 102, 902 may include similar components and/or functionality to the A/V devices 210. The A/V devices 210 may include security cameras 210(a), light cameras 210(b) (e.g., floodlight cameras, spotlight cameras, etc.), video doorbells 210(c) (e.g., wall powered and/or battery powered video doorbells), and/or other devices capable of recording audio data and/or image data. The A/V devices 210 may be configured to access a user's network 218 to connect to a network (Internet/PSTN) 212 and/or may be configured to access a cellular network to connect to the network (Internet/PSTN) 212. The components and functionality of the A/V devices 210 are described in more detail below with respect to FIG. 3.

The system 200 may further include a smart-home hub device 202 (which may alternatively be referred to herein as the "hub device 202") connected to the user's network 218 and/or the network (Internet/PSTN) 212. The smart-home hub device 202 (also known as a home automation hub, gateway device, or network device), may comprise any device that facilitates communication with and control of the sensors 204, automation devices 206, the VA device 208, and/or the one or more A/V devices 210. For example, the smart-home hub device 202 may be a component of a security system and/or a home automation system installed at a location (e.g., a property, a premise, a home, a business, etc.). In some embodiments, the A/V devices 210, the VA device 208, the sensors 204, and/or the automation devices 206 communicate with the smart-home hub device 202 directly and/or indirectly using one or more wireless and/or wired communication protocols (e.g., BLE, Zigbee, Z-Wave, etc.), the user's network 218 (e.g., Wi-Fi, Ethernet, etc.), and/or the network (Internet/PSTN) 212. In some of the present embodiments, the A/V devices 210, the VA device 208, the sensors 204, and/or the automation devices 206 may, in addition to or in lieu of communicating with the smart-home hub device 202, communicate with the client devices 214, 216, the VA device 208, and/or one or more of components of the network of servers/backend devices 220 directly and/or indirectly via the user's network 218 and/or the network (Internet/PSTN) 212.

As illustrated in FIG. 2, the system 200 includes the VA device 208. The VA device 208 may be connected to the user's network 218 and/or the network (Internet/PSTN) 212. The VA device 208 may include an intelligent personal assistant, such as, without limitation, Amazon Alexa® and/or Apple Siri®. For example, the VA device 208 may be configured to receive voice commands, process the voice commands to determine one or more actions and/or responses (e.g., transmit the voice commands to the one or more components of the network of servers/backend devices 220 for processing), and perform the one or more actions and/or responses, such as to activate and/or change the status of one or more of the sensors 204, automation devices 206, or A/V devices 210. In some embodiments, the VA device 208 is configured to process user inputs (e.g., voice commands) without transmitting information to the network of servers/backend devices 220 for processing. The VA device 208 may include at least one speaker (e.g., for playing music, for outputting the audio data generated by the A/V devices 210, for outputting the voice of a digital assistant, etc.), at least one a microphone (e.g., for receiving commands, for recording audio data, etc.), and a display (e.g., for displaying a user interface, for displaying the image data generated by the A/V devices 210, etc.). In various embodiments, the VA device 208 may include an array of speakers that are able to produce beams of sound. Although illustrated as a separate component in FIG. 2, in some embodiments the VA device 208 may not be a separate component from the hub device 202. In such embodiments, the hub device 202 may include the functionality of the VA device 208 or the VA device 208 may include the functionality of the hub device 202.

The one or more sensors 204 may include, for example, at least one of a door sensor, a window sensor, a contact sensor, a tilt sensor, a temperature sensor, a carbon monoxide sensor, a smoke detector, a light sensor, a glass break sensor, a freeze sensor, a flood sensor, a moisture sensor, a motion sensor, and/or other sensors that may provide the user/owner of the security system a notification of a security event at his or her property.

In various embodiments, a contact sensor may include any component configured to inform (e.g., via a signal) the security system whether an object (e.g., a door or a window) is open or closed. A contact sensor may include first and second components: a first component installed on the object itself (e.g., the door or the window); the second component installed next to the object (e.g., on the door jamb). The first and second components of the contact sensor, however, need not actually be in physical contact with one another in order to be in the closed (not faulted) state. For example, at least one of the first and second components may include a magnet, and the contact sensor may rely on the Hall effect for determining a proximity of the first and second pieces to one another. When the door, window, or other object, is opened, and the first and second components move apart from one another, the contact sensor may transmit an open signal to the security system (e.g., to the hub device 202). A similar process may be performed when the object is closed. In some examples, a signal transmitted by the security system by the contact sensor during opening and/or closing may be the same signal, and the hub device 202 may interpret the signal based on the known state of the object (e.g., when a door is closed, and the signal is received, the hub device 202 may update the status of the door to open).

The one or more automation devices 206 may include, for example, at least one of an outdoor lighting system, an indoor lighting system, and indoor/outdoor lighting system, a temperature control system (e.g., a thermostat), a shade/blind control system, a locking control system (e.g., door lock, window lock, etc.), a home entertainment automation system (e.g., TV control, sound system control, etc.), an irrigation control system, a wireless signal range extender (e.g., a Wi-Fi range extender, a Z-Wave range extender, etc.)

a doorbell chime, a barrier control device (e.g., an automated door hinge), a smart doormat, and/or other automation devices.

As described herein, in some of the present embodiments, some or all of the client devices 214, 216, the A/V device(s) 210, the smart-home hub device 202, the VA device 208, the sensors 204, and the automation devices 206 may be referred to as a security system and/or a home-automation system. The security system and/or home-automation system may be installed at location, such as a property, home, business, or premises for the purpose of securing and/or automating all or a portion of the location.

The system 200 may further include one or more client devices 214, 216 (which may represent, and/or be similar to, the client device 130 of FIGS. 1A and 1B and/or the client device 930 of FIG. 1E). The client devices 214, 216 may communicate with and/or be associated with (e.g., capable of access to and control of) the A/V devices 210, a smart-home hub device 202, the VA device 208, sensors 204, and/or automation devices 206. In various embodiments, the client devices 214, 216 communicate with other devices using one or more wireless and/or wired communication protocols, the user's network, and/or the network (Internet/PSTN) 212, as described herein. The client devices 214, 216 may comprise, for example, a mobile device such as a smartphone or a personal digital assistant (PDA), or a computing device such as a tablet computer, a laptop computer, a desktop computer, etc. In some embodiments, the client devices 214, 216 includes a connected device, such as a smart watch, Bluetooth headphones, another wearable device, or the like. In such embodiments, the client devices 214, 216 may include a combination of the smartphone or other device and a connected device (e.g., a wearable device), such that alerts, data, and/or information received by the smartphone or other device are provided to the connected device, and one or more controls of the smartphone or other device may be input using the connected device (e.g., by touch, voice, etc.).

The A/V devices 210, the hub device 202, the VA device 208, the automation devices 206, the sensors 204, and/or the client devices 214, 216 may also communicate, via the user's network 218 and/or the network (Internet/PSTN) 212, with network(s) of servers and/or backend devices 220, such as (but not limited to) one or more remote storage devices 222 (may be referred to interchangeably as "cloud storage device(s)"), one or more backend servers 224, and one or more backend application programming interfaces (APIs) 226. While FIG. 2 illustrates the storage device 222, the backend server 224, and the backend API 226 as components separate from the network 220, it is to be understood that the storage device 222, the backend server 224, and/or the backend API 226 may be considered to be components of the network 220. For example, the network 220 may include a data center with a plurality of computing resources used to implement the storage device 222, the backend server 224, and the backend API 226.

The backend server 224 may comprise a computer program or other computer executable code that, when executed by processor(s) of the backend server 224, causes the backend server 224 to wait for requests from other computer systems or software (clients) and provide responses. In an embodiment, the backend server 224 shares data and/or hardware and/or software resources among the client devices 214, 216. This architecture is called the client-server model. The client devices 214, 216 may run on the same computer or may connect to the backend server 224 over the network (Internet/PSTN) 212 and/or the network 220. Examples of computing servers include database servers, file servers, mail servers, print servers, web servers, game servers, and application servers. The term server may be construed broadly to include any computerized process that shares a resource to one or more client processes.

The backend API 226 may comprise, for example, a server (e.g. a real server, or a virtual machine, or a machine running in a cloud infrastructure as a service), or multiple servers networked together, exposing at least one API to clients. In various embodiments, the backend API 226 is provided by servers including various components such as an application server (e.g. software servers), a caching layer, a database layer, or other components suitable for implementing one or more APIs. The backend API 226 may, for example, comprise a plurality of applications, each of which communicate with one another using one or more public APIs. In some embodiments, the backend API 226 maintains user data and provides user management capabilities, thereby reducing the load (e.g., memory and processor consumption) of the client devices 214, 216.

In various embodiments, an API is a set of routines, protocols, and tools for building software and applications. Furthermore, the API may describe a software component in terms of its operations, inputs, outputs, and underlying types, defining functionalities that are independent of their respective implementations, which allows definitions and implementations to vary without compromising the interface. As such, the API may provide a programmer with access to a particular application's functionality without the need to modify the particular application.

The backend API 226 illustrated in FIG. 2 may further include one or more services (also referred to as network services). A network service is an application that provides data storage, manipulation, presentation, communication, and/or other capability. Network services are often implemented using a client-server architecture based on application-layer network protocols. Each service may be provided by a server component (e.g., the backend server 224) running on one or more computers (such as a dedicated server computer offering multiple services) and accessed via a network by client components running on other devices (e.g., client devices 214, 216). However, the client and server components can both be run on the same machine. Clients and servers may have a user interface, and sometimes other hardware associated with them.

The network 220 may be any wireless network, any wired network, or a combination thereof, configured to operatively couple the above-mentioned modules, devices, components, and/or systems as illustrated in FIG. 2. For example, the network 220, the user's network 218, and/or the network (Internet PSTN) 212 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, global navigation satellite system (GNSS), such as global positioning systems (GPS), CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-4024 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

The hub device 202, the VA device 208, and/or any of the components of the network(s) of servers/backend devices 220 (e.g., the backend server 224, the backend API 226, the storage devices 222, etc.) may be referred to herein as a "network device" or "network devices." The remote server 126 of FIG. 1A and/or the remote server 926 of FIG. 1E may include one or more of the network devices described herein. The servers/backend devices 220 may include similar components and/or functionality to the remote servers 126 and 926.

With further reference to FIG. 2, the system 200 may also include a security monitoring service 228. The security monitoring service 228 may be operated by the same company that manufactures, sells, and/or distributes the A/V devices 210, the hub device 202, the VA device 208, the sensors 204, and/or the automation devices 206. In other embodiments, the security monitoring service 228 may be operated by a third-party company (e.g., a different company than the one that manufactured, sold, and/or distributed the A/V devices 210, the hub device 202, the VA device 208, the sensors 204, and/or the automation devices 206). In any of the present embodiments, the security monitoring service 228 may have control of at least some of the features and components of the security system and/or the home-automation system (e.g., the security monitoring service 228 may be able to arm and/or disarm the security system, lock and/or unlock doors, activate and/or deactivate one or more of the sensors 204 and/or the automation devices 206, etc.). For example, the security monitoring service 228 may operate and control their own client devices and/or network of servers/backend devices for monitoring and/or controlling security systems. In such an example, the A/V devices 210, the hub device 202, the VA device 208, the sensors 204, and/or the automation devices 206 may communicate with the client devices and/or one or more components of the network of servers/backend devices of the security monitoring service 228 over the network (Internet/PSTN) 212 (in some embodiments, via one or more of the components of the network of backend servers/backend devices 220).

Figure 3:
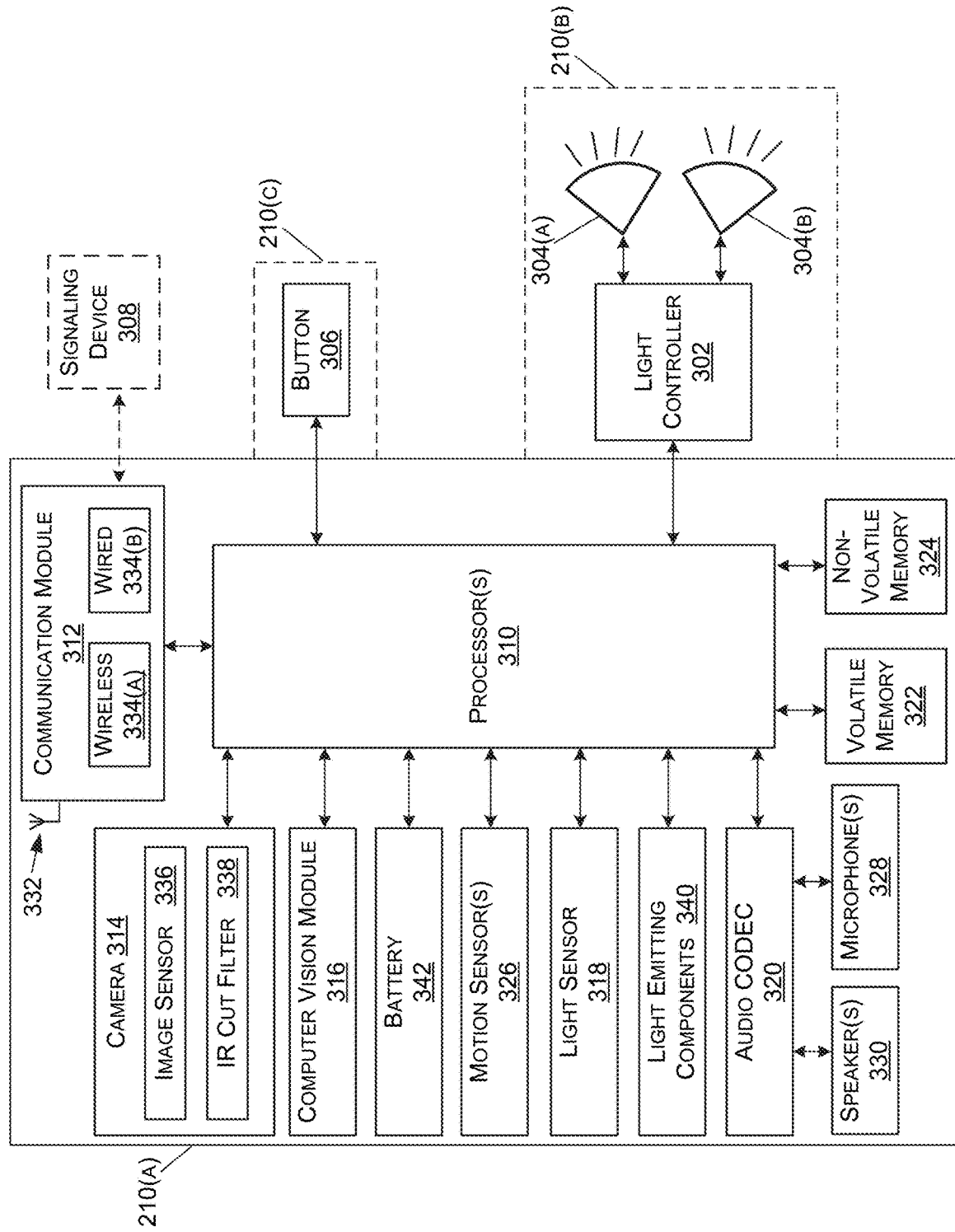
FIG. 3 is a functional block diagram of an A/V recording and communication device according to various aspects of the present disclosure.

FIG. 3 is a functional block diagram for an audio/video (A/V) device according to various aspects of the present disclosure. In some embodiments, the one or more A/V devices 210 may include the security camera 210(a). In other embodiments, the one or more A/V devices 210 may include the light camera 210(b), which may include some or all of the components of the security camera 210(a) in addition to a light controller 302 and one or more lights 304(a), 304(b). In some embodiments, the one or more A/V devices 210 may include the video doorbell 210(c), which may include some or all of the components of the security camera 210(a) in addition to a button 306, and in some embodiments, a connection to a signaling device 308 (e.g., a pre-installed signaling device, such as a wired signaling device, and/or a wireless signaling device, connected over Wi-Fi, BLE, or the another wireless communication protocol).

With further reference to FIG. 3, the A/V device 210 may include a processor(s) 310, a communication module 312, a camera 314, a computer vision module 316, a light sensor 318, an audio CODEC (coder-decoder) 320, volatile memory 322, and non-volatile memory 324. The processor(s) 310 (alternatively referred to herein as a "CPU," a "controller," and/or a "microcontroller") may comprise an integrated circuit including a processor core, memory, and programmable input/output peripherals. The processor(s) 310 may receive input signals, such as data and/or power, from the camera 314, motion sensor(s) 326, light sensor 318, microphone(s) 328, speaker(s) 330, and/or the communication module 312, and may perform various functions as described in the present disclosure. In various embodiments, when the processor(s) 310 is triggered by the motion sensor(s) 326, the camera 314, the speaker(s) 330, the microphone(s) 328, the communication module 312, and/or another component, the processor(s) 310 performs one or more processes and/or functions. For example, when the light sensor 318 detects a low level of ambient light, the light sensor 318 may trigger the processor(s) 310 to enable a night vision camera mode. The processor(s) 310 may also provide data communication between various components such as between the communication module 312 and the camera 314.

With further reference to FIG. 3, the communication module 312 may comprise an integrated circuit including a processor core, memory, and programmable input/output peripherals. The communication module 312 may be operatively connected to the processor(s) 310. In some embodiments, the communication module 312 is configured to handle communication links between the A/V device 210 and other, external devices, external receivers, external transmitters, and/or external transceivers, and to route incoming/outgoing data appropriately. For example, inbound data from an antenna 332 of the communication module 312 may be routed through the communication module 312 before being directed to the processor(s) 310, and outbound data from the processor(s) 310 may be routed through the communication module 312 before being directed to the antenna 332 of the communication module 312. As another example, the communication module 312 may be configured to transmit data to and/or receive data from a remote network device (e.g., one or more components of the network(s) of servers/backend devices 220 described in FIG. 2). The communication module 312 may include wireless 334(a) and wired 334(b) adapters. For example, the communication module 312 may include one or more wireless antennas, radios, receivers, transmitters, and/or transceivers (not shown in FIG. 3 for simplicity) configured to enable communication across one or more wireless networks, such as, without limitation, Wi-Fi, cellular, Bluetooth, Z-Wave, Zigbee, LPWAN(s), and/or satellite networks. The communication module 312 may receive inputs, such as power and/or data, from the camera 314, the processor(s) 310, the button 306 (in embodiments where the A/V device 210 is the video doorbell 210(c)), the motion sensors 326, a reset button (not shown in FIG. 3 for simplicity), and/or the non-volatile memory 324. The communication module 312 may also include the capability of communicating over wired connections, such as with a signaling device 308. For example, when the button 306 of the video doorbell 210(*c*) is pressed, the communication module 312 may be triggered to perform one or more functions, such as to transmit a signal over the wired 334(*b*) connection to the signaling device 308 (although, in some embodiments, the signal be transmitted over a wireless 334(*a*) connection to the signaling device) to cause the signaling device 308 to emit a sound (e.g., a doorbell tone, a user customized sound, a ringtone, a seasonal ringtone, etc.). The communication module 312 may also act as a conduit for data communicated between various components and the processor(s) 310.

With further reference to FIG. 3, the A/V device 210 may include the non-volatile memory 324 and the volatile memory 322. The non-volatile memory 324 may comprise flash memory configured to store and/or transmit data. For example, in certain embodiments the non-volatile memory 324 may comprise serial peripheral interface (SPI) flash memory. In some embodiments, the non-volatile memory 324 may comprise, for example, NAND or NOR flash memory. The volatile memory 322 may comprise, for example, DDR3 SDRAM (double data rate type three synchronous dynamic random-access memory). In the embodiment illustrated in FIG. 3, the volatile memory 322 and the non-volatile memory 324 are illustrated as being separate from the processor(s) 310. However, the illustration of FIG. 3 is not intended to be limiting, and in some embodiments the volatile memory 322 and/or the non-volatile memory 324 may be physically incorporated with the processor(s) 310, such as on the same chip. The volatile memory 322 and/or the non-volatile memory 324, regardless of their physical location, may be shared by one or more other components (in addition to the processor(s) 310) of the present A/V device 210.

With further reference to FIG. 3, the A/V device 210 may include the camera 314. The camera 314 may include an image sensor 336. The image sensor 336 may include a video recording sensor and/or a camera chip. In one aspect of the present disclosure, the imager sensor 336 may comprise a complementary metal-oxide semiconductor (CMOS) array and may be capable of recording high definition (e.g., 722p, 1800p, 4K, etc.) video files. The camera 314 may include a separate camera processor (not shown in FIG. 3 for simplicity), or the processor(s) 310 may perform the camera processing functionality. The processor(s) 310 (and/or camera processor) may include an encoding and compression chip. In some embodiments, the processor(s) 310 (and/or the camera processor) may comprise a bridge processor. The processor(s) 310 (and/or the camera processor) may process video recorded by the image sensor 336 and/or audio recorded by the microphone(s) 328, and may transform this data into a form suitable for transfer by the communication module 312 to the network (Internet/PSTN) 212. In various embodiments, the camera 314 also includes memory, such as volatile memory that may be used when data is being buffered or encoded by the processor(s) 310 (and/or the camera processor). For example, in certain embodiments the camera memory may comprise synchronous dynamic random-access memory (SD RAM).

The camera 314 may further include an IR cut filter 338 that may comprise a system that, when triggered, configures the image sensor 336 to see primarily infrared light as opposed to visible light. For example, when the light sensor 318 detects a low level of ambient light (which may comprise a level that impedes the performance of the image sensor 336 in the visible spectrum), the light emitting components 229 may shine infrared light through an enclosure of the A/V device 210 out to the environment, and the IR cut filter 338 may enable the image sensor 336 to see this infrared light as it is reflected or refracted off of objects within the field of view of the doorbell. This process may provide the A/V device with the "night vision" function mentioned above.

With further reference to FIG. 3, the recording and communication A/V device 210 may comprise the light sensor 318 and the one or more light-emitting components 340, such as LED's. The light sensor 318 may be one or more sensors capable of detecting the level of ambient light of the surrounding environment in which the A/V device 210 may be located. The light-emitting components 340 may be one or more light-emitting diodes capable of producing visible light when supplied with power (e.g., to enable night vision). In some embodiments, when activated, the light-emitting components 340 illuminates a light pipe.

The A/V device 210 may further include one or more speaker(s) 330 and/or one or more microphone(s) 328. The speaker(s) 330 may be any electromechanical device capable of producing sound in response to an electrical signal input. The microphone(s) 328 may be an acoustic-to-electric transducer or sensor capable of converting sound waves into an electrical signal. In some embodiments, the A/V device 210 may include two or more microphone(s) 328 that are spaced from one another (e.g., located on different sides of the A/V device 210) to provide noise cancelling and/or echo cancelling for clearer audio. The speaker(s) 330 and/or microphone(s) 328 may be coupled to an audio CODEC 320 to enable digital audio received by client devices to be decompressed and output by the speaker(s) 330 and/or to enable audio data captured by the microphone(s) 328 to be compressed into digital audio data. The digital audio data may be received from and transmitted to client devices using the communication module 312 (in some embodiments, through one or more intermediary devices such as the hub device 202, the VA device 208, and/or one or more components of the network of servers/backend devices 220 as described in FIG. 2). For example, when a visitor (or intruder) who is present in the area about the A/V device 210 speaks, sound from the visitor (or intruder) is received by the microphone(s) 328 and compressed by the audio CODEC 320. Digital audio data is then sent through the communication module 312 to the network 212 via the user's network 218, routed by the backend server 224 and/or the backend API 226 and delivered to the client device(s) 214, 216 as described above in connection with FIG. 2. When the user speaks, after being transferred through the network 212, the user's network 218, and the communication module 312, the digital audio data from the user is decompressed by the audio CODEC 320 and emitted to the visitor through the speaker(s) 330.

With further reference to FIG. 3, the A/V device 210 may be battery powered using a battery 342 and/or may be powered using a source of external AC (alternating-current) power, such as a household AC power supply (alternatively referred to herein as "AC mains" or "wall power"). The AC power may have a voltage in the range of 110-220 VAC, for example. The incoming AC power may be received by an AC/DC adapter (not shown), which may convert the incoming AC power to DC (direct-current) and may step down the voltage from 110-220 VAC to a lower output voltage of about 12 VDC and an output current of about 2 A, for example. In various embodiments, the output of the AC/DC adapter is in a range from about 9 V to about 15 V and in a range from about 0.5 A to about 5 A. These voltages and currents are examples provided for illustration and are not intended to be limiting.

However, in other embodiments, a battery 342 may not be included. In embodiments that include the battery 342, the A/V device 210 may include an integrated circuit (not shown) capable of arbitrating between multiple voltage rails, thereby selecting the source of power for the A/V device 210. The A/V device 210 may have separate power rails dedicated to the battery 342 and the AC power source. In one aspect of the present disclosure, the A/V device 210 may continuously draw power from the battery 342 to power the A/V device 210, while at the same time routing the AC power to the battery, thereby allowing the battery 342 to maintain a substantially constant level of charge. Alternatively, the A/V device 210 may continuously draw power from the AC power to power the doorbell, while only drawing from the battery 342 when the AC power is low or insufficient. Still, in some embodiments, the battery 342 comprises the sole source of power for the A/V device 210. In such embodiments, the components of the A/V device 210 (e.g., spring contacts, connectors, etc.) are not be connected to a source of AC power. When the battery 342 is depleted of its charge, it may be recharged, such as by connecting a power source to the battery 342 (e.g., using a USB connector).

Although not illustrated in FIG. 3, in some embodiments, the A/V device 210 may include one or more of an accelerometer, a barometer, a humidity sensor, and a temperature sensor. The accelerometer may be one or more sensors capable of sensing motion and/or acceleration. The one or more of the accelerometer, the barometer, the humidity sensor, and the temperature sensor may be located outside of a housing of the A/V device 210 so as to reduce interference from heat, pressure, moisture, and/or other stimuli generated by the internal components of the A/V device 210.

With further reference to FIG. 3, the A/V device 210 may include one or more motion sensor(s) 326. However, in some embodiments, the motion sensor(s) 326 may not be included, such as where motion detection is performed by the camera 314 or another device. The motion sensor(s) 326 may be any type of sensor capable of detecting and communicating the presence of an entity within their field of view. As such, the motion sensor(s) 326 may include one or more (alone or in combination) different types of motion sensors. For example, in some embodiments, the motion sensor(s) 326 may comprise passive infrared (PIR) sensors, which may be secured on or within a PIR sensor holder that may reside behind a lens (e.g., a Fresnel lens). In such an example, the PIR sensors may detect IR radiation in a field of view, and produce an output signal (typically a voltage) that changes as the amount of IR radiation in the field of view changes. The amount of voltage in the output signal may be compared, by the processor(s) 310, for example, to one or more threshold voltage values to determine if the amount of voltage in the output signal is indicative of motion, and/or if the amount of voltage in the output signal is indicative of motion of an entity that is to be captured by the camera 314 (e.g., motion of a person and/or animal may prompt activation of the camera 314, while motion of a vehicle may not). Although the above discussion of the motion sensor(s) 326 primarily relates to PIR sensors, depending on the embodiment, the motion sensor(s) 326 may include additional and/or alternate sensor types that produce output signals including alternative data types. For example, and without limitation, the output signal may include an amount of voltage change based on the presence of infrared radiation in a field of view of an active infrared (AIR) sensor, the output signal may include phase shift data from a microwave-type motion sensor, the output signal may include doppler shift data from an ultrasonic-type motion sensor, the output signal may include radio wave disturbance from a tomographic-type motion sensor, and/or the output signal may include other data types for other sensor types that may be used as the motion sensor(s) 326 of the A/V device 210.

In some embodiments, computer vision module(s) (CVM) 316 may be included in the A/V device 210 as the motion sensor(s) 326, in addition to, or alternatively from, other motion sensor(s) 326. For example, the CVM 316 may be a low-power CVM (e.g., Qualcomm Glance) that, by operating at low power (e.g., less than 2 mW of end-to-end power), is capable of providing computer vision capabilities and functionality for battery powered devices (e.g., the A/V device 210 when powered by the battery 342). The low-power CVM may include a lens, a CMOS image sensor, and a digital processor that may perform embedded processing within the low-power CVM itself, such that the low-power CVM may output post-processed computer vision metadata to the processor(s) 310 (e.g., via a serial peripheral interface (SPI)). As such, the low-power CVM may be considered to be one or more of the motion sensor(s) 326, and the data type output in the output signal may be the post-processed computer vision metadata. The metadata may include information such as the presence of a particular type of entity (e.g., person, animal, vehicle, parcel, etc.), a direction of movement of the entity, a distance of the entity from the A/V device 210, etc. In various embodiments, the motion sensor(s) 326 include a plurality of different sensor types capable of detecting motion such as PIR, AIR, low-power CVM, and/or cameras.

As indicated above, the A/V device 210 may include the CVM 316 (which may be the same as the above described low-power CVM 316 implemented as one or more motion sensor(s) 326, or may be additional to, or alternative from, the above described low-power CVM 316). For example, the A/V device 210, the hub device 202, the VA device 208, and/or one or more component of the network(s) of servers/backend devices 220 may perform any or all of the computer vision processes and functionalities described herein. In addition, although the CVM 316 is only illustrated as a component of the A/V device 210, the computer vision module 316 may additionally, or alternatively, be included as a component of the hub device 202, the VA device 208, and/or one or more components of the network of servers/backend devices 220. With respect to the A/V device 210, the CVM 316 may include any of the components (e.g., hardware) and/or functionality described herein with respect to computer vision, including, without limitation, one or more cameras, sensors, and/or processors. In some of the present embodiments, with reference to FIG. 3, the microphone(s) 328, the camera 314, the processor(s) 310, and/or the image sensor 336 may be components of the CVM 316. In some embodiments, the CVM 316 may include an internal camera, image sensor, and/or processor, and the CVM 316 may output data to the processor(s) 310 in an output signal, for example.

As a result of including the CVM 316, some of the present embodiments may leverage the CVM 316 to implement computer vision for one or more aspects, such as motion detection, object recognition, and/or facial recognition. Computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)—Differentiating human beings (e.g., head and shoulder patterns) from objects.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance.

Pre-processing—Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; Estimation of application-specific parameters, such as object pose or object size; Image recognition—classifying a detected object into different categories; Image registration—comparing and combining two different views of the same object.

Decision making—Making the final decision required for the application, for example match/no-match in recognition applications.

One or more of the present embodiments may include a vision processing unit (not shown separately, but may be a component of the CVM 316). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a manycore DSP (digital signal processor). But, like video processing units, vision processing units may have a focus on low precision fixed-point arithmetic for image processing.

Some of the present embodiments may use facial recognition hardware and/or software, as a part of the computer vision system. Various types of facial recognition exist, some or all of which may be used in the present embodiments.

Some face recognition algorithms identify facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. One of the earliest successful systems is based on template matching techniques applied to a set of salient facial features, providing a sort of compressed face representation.

Recognition algorithms can be divided into two main approaches, geometric, which looks at distinguishing features, or photometric, which is a statistical approach that distills an image into values and compares the values with templates to eliminate variances.

Popular recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching.

Further, a newly emerging trend, claimed to achieve improved accuracy, is three-dimensional face recognition. This technique uses 3D sensors to capture information about the shape of a face. This information is then used to identify distinctive features on the surface of a face, such as the contour of the eye sockets, nose, and chin.

One advantage of 3D face recognition is that it is not affected by changes in lighting like other techniques. It can also identify a face from a range of viewing angles, including a profile view. Three-dimensional data points from a face vastly improve the precision of face recognition. 3D research is enhanced by the development of sophisticated sensors that do a better job of capturing 3D face imagery. The sensors work by projecting structured light onto the face. Up to a dozen or more of these image sensors can be placed on the same CMOS chip—each sensor captures a different part of the spectrum.

Another variation is to capture a 3D picture by using three tracking cameras that point at different angles; one camera pointing at the front of the subject, a second one to the side, and a third one at an angle. All these cameras work together to track a subject's face in real time and be able to face detect and recognize.

Another emerging trend uses the visual details of the skin, as captured in standard digital or scanned images. This technique, called skin texture analysis, turns the unique lines, patterns, and spots apparent in a person's skin into a mathematical space.

Another form of taking input data for face recognition is by using thermal cameras, which may only detect the shape of the head and ignore the subject accessories such as glasses, hats, or make up.

Further examples of automatic identification and data capture (AIDC) and/or computer vision that can be used in the present embodiments to verify the identity and/or authorization of a person include, without limitation, biometrics. Biometrics refers to metrics related to human characteristics. Biometrics authentication (or realistic authentication) is used in various forms of identification and access control. Biometric identifiers are the distinctive, measurable characteristics used to label and describe individuals. Biometric identifiers can be physiological characteristics and/or behavioral characteristics. Physiological characteristics may be related to the shape of the body. Examples include, but are not limited to, fingerprints, palm veins, facial recognition, three-dimensional facial recognition, skin texture analysis, DNA, palm prints, hand geometry, iris recognition, retina recognition, and odor/scent recognition. Behavioral characteristics may be related to the pattern of behavior of a person, including, but not limited to, typing rhythm, gait, and voice recognition.

The present embodiments may use any one, or any combination of more than one, of the foregoing biometrics to identify and/or authenticate a person who is either suspicious or who is authorized to take certain actions with respect to a property or expensive item of collateral. For example, with reference to FIG. 3, the CVM 316, and/or the camera 314 and/or the processor(s) 310 may receive information about the person using any one, or any combination of more than one, of the foregoing biometrics.

Again, with reference to FIG. 3, in embodiments where the A/V device 210 includes a light camera, the A/V device 210 may include the light controller 302 and one or more lights 304(a), 304(b) (collectively referred to herein as "lights 304"). The light controller 302 may include a switch for controlling the lights 304. For example, in response to the motions sensor(s) 326 and/or the camera 314 detecting motion, the light controller 236 may receive an output signal from the processor(s) 310 that causes the light controller 302 to activate the one or more lights 304(a), 304(b). In some embodiments, the light camera may include motion sensor(s) 326 detecting motion for controlling activation of the lights 304, and may further include the camera 314 for detecting motion for activating the recording of the image data using the camera 314 and/or the recording of the audio data using the microphone(s) 328. In other embodiments, the motion sensor(s) 326 may detect the motion for activating the lights 304, the camera 314, and the microphone(s) 328, or the camera 314 may detect the motion for activating the lights 304, the camera 314 to being recording the image data, and the microphone(s) 328 to being recording the audio data. The lights 304 may include floodlights, spotlights, porch lights, or another type of illumination device. The lights 304 may provide for better image data quality when ambient light levels are low (e.g., at dusk, dawn, or night), while also providing a deterrent effect by being illuminated when motion is detected.

With further reference to FIG. 3, in embodiments where the A/V device 210 includes a doorbell, such as the video doorbell 210(c), the A/V device 210 may include the button 306. In embodiments where the button 306 is a mechanical button (e.g., has a range of movement), the button 306 may make contact with a button actuator located within the video doorbell 210(c) when the button 306 is pressed. In embodiments where the button 306 is not mechanical (e.g., has no range of motion), the button 306 may include a capacitive touch button, a resistive touch button, a surface acoustic wave (SAW) button, an infrared (IR) button, an optical imaging button, an acoustic pulse recognition button, and/or a button that implements a low-power CVM for the detection of a person (e.g., a finger, hand, etc., of a person). When the button 306 is pressed, touched, and/or otherwise triggered, the processor(s) 310 may receive an output signal from the button 306 that may activate one or more functions of the video doorbell 210(c), such as transmitting an output signal, using the communication module 312, to the signaling device 308 to cause the signaling device 308 to output a sound (e.g., via the wired 334(b) connection to the signaling device 308 and/or a wireless 334(a) connection to the signaling device 308). In addition, the processor(s) 310 may transmit an output signal (e.g., a message), using the communication module 312, to the client device(s) 214, 216 to indicate to the user(s) of the client device(s) 214, 216 that a person is present at the A/V device 210 (in some embodiments, via at least one of the hub device 202, the VA device 208, and/or one or more component of the network of servers/backend devices 220).

Although the A/V recording and communication device 210 (or A/V device 210) is referred to herein as an "audio/video" device, the A/V device 210 need not have both audio and video functionality. For example, in some embodiments, the A/V device 210 may not include the speakers 330, microphones 328, and/or audio CODEC. In such examples, the A/V device 210 may only have video recording and communication functionalities. In other examples, the A/V device 210 may only have the speaker(s) 330 and not the microphone(s) 328, or may only have the microphone(s) 328 and not the speaker(s) 330.

Figure 4:
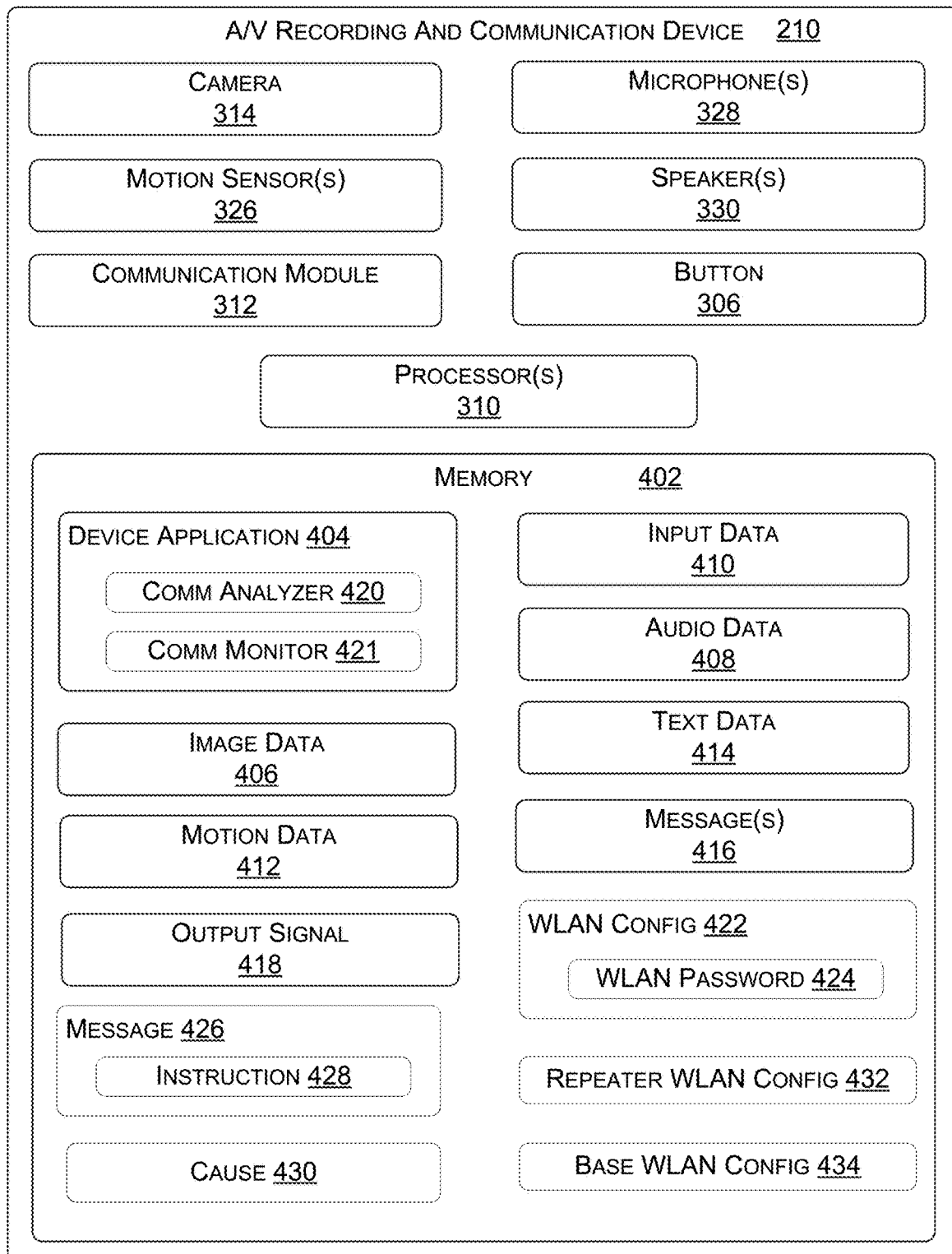
FIG. 4 is a functional block diagram illustrating one example embodiment of an A/V recording and communication device according to various aspects of the present disclosure.

FIG. 4 is another functional block diagram illustrating an embodiment of the A/V device 210 according to various aspects of the present disclosure. In some embodiments, the A/V device 210 may represent, and further include one or more of the components from, the A/V recording and communication doorbell 210(c), the A/V recording and communication security camera 210(a), and/or the floodlight controller 210(b). Additionally, in some embodiments, the A/V device 210 may omit one or more of the components shown in FIG. 4 and/or may include one or more additional components not shown in FIG. 4.

As shown in FIG. 4, the A/V device 210 includes memory 402, which may represent the volatile memory 322 and/or the non-volatile memory 324. The memory 402 stores a device application 404. In various embodiments, the device application 404 may configure the processor(s) 310 to capture image data 406 using the camera 314, audio data 408 using the microphone(s) 328, input data 410 using the button 306 (and/or the camera 314 and/or the motion sensor(s) 326, depending on the embodiment), and/or motion data 412 using the camera 314 and/or the motion sensor(s) 326. In some embodiments, the device application 404 may also configure the processor(s) 310 to generate text data 414 describing the image data 406, the audio data 408, and/or the input data 410, such as in the form of metadata, for example.

In addition, the device application 404 may configure the processor(s) 310 to transmit the image data 406, the audio data 408, the motion data 412, the input data 410, the text data 414, and/or message(s) 416 to the client devices 214, 216, the hub device 202, and/or the backend server 224 using the communication module 312. In various embodiments, the device application 404 may also configure the processor(s) 310 to generate and transmit an output signal 418 that may include the image data 406, the audio data 408, the text data 414, the input data 410, and/or the motion data 412. In some of the present embodiments, the output signal 418 may be transmitted to the backend server 224 and/or the hub device 202 using the communication module 312. The backend server 224 may then transmit (or forward) the output signal 418 to the client device(s) 214, 216, and/or the hub device 202 may then transmit (or forward) the output signal 418 to the client device(s) 214, 216, and/or the hub device 202 may then transmit (or forward) the output signal 418 to the backend server 224, and the backend server 224 may then transmit (or forward) the output signal 418 to the client device(s) 214, 216. In other embodiments, the output signal 418 may be transmitted directly to the client device(s) 214, 216 by the A/V device 210.

In further reference to FIG. 4, the image data 406 may comprise image sensor data such as (but not limited to) exposure values and data regarding pixel values for a particular sized grid. The image data 406 may include still images, live video, and/or pre-recorded images and/or video. The image data 406 may be recorded by the camera 314 in a field of view of the camera 314.

In further reference to FIG. 4, the motion data 412 may comprise motion sensor data generated in response to motion events. For example, the motion data 412 may include an amount or level of a data type generated by the motion sensor(s) 326 (e.g., the voltage level output by the motion sensor(s) 326 when the motion sensor(s) 326 are PIR type motion sensor(s)). In some of the present embodiments, such as those where the A/V device 210 does not include the motion sensor(s) 326, the motion data 412 may be generated by the camera 314. In such embodiments, based on a frame by frame comparison of changes in the pixels from the image data 406, it may be determined that motion is present.

The input data 410 may include data generated in response to an input to the button 306. The button 306 may receive an input (e.g., a press, a touch, a series of touches and/or presses, etc.) and may generate the input data 410 in response that is indicative of the type of input. In embodiments where the A/V device 210 is not a doorbell (e.g., the video doorbell 210(c)), the A/V device 210 may not include the button 306, and the A/V device 210 may not generate the input data 410.

With further reference to FIG. 4, a message 416 may be generated by the processor(s) 310 and transmitted, using the communication module 312, to the client device 214, 216, the backend server 224, and/or the hub device 202. For example, in response to detecting motion using the camera 314 and/or the motion sensor(s) 326, the A/V device 210 may generate and transmit the message 416. In some of the present embodiments, the message 416 may include at least the image data 406, the audio data 408, the text data 414, and/or the motion data 412.

As described herein, the message(s) 416 may include messages, signals, data, notifications, and/or any type of electronic communication that electronic devices (e.g., the A/V device 210, the client device 214, 216, the hub device 202, and/or one or more components of the network(s) of servers/backend devices 220) may transmit and receive with other electronic devices (e.g., the A/V device 210, the client device 214, 216, the hub device 202, and/or one or more components of the network(s) of servers/backend devices 220). For instance, message(s) 416 may include push notifications, email messages, short message service (SMS) messages, multimedia messages (MMS), voicemail messages, video signals, audio signals, data transmissions, and/or any other type of electronic communication that an electronic device can send to another electronic device.

The image data 406, the audio data 408, the text data 414, and/or the motion data 412 may be tagged with (e.g., a time stamp, based on clock data) and/or stored separately (e.g., on the backend server 224, the hub device 202, and/or the A/V device 210) based on when the motion was detected, how long the motion was detected for, and/or a duration of time associated with the detected motion, or motion event (e.g., the duration of time may include the time the motion was detected plus an additional time, such as, without limitation, 5 seconds, 10 seconds, or 30 seconds). For example, each separate detection of motion, or motion event, may be associated with image data 406, audio data 408, text data 414, and/or motion data 412 representative of the detection of motion, or motion event. As a result, when a request for data pertaining to particular motion event, or a particular time period, is received (e.g., by the client device 214, 216, the backend server 224, and/or the hub device 202), the image data 406, the audio data 408, the text data 414, and/or the motion data 412 associated with a particular motion event, and/or associated with motion event(s) within the particular time period, may be transmitted, retrieved, and/or received.

Although examples discuss the A/V device 210 generating and transmitting the image data 406, the audio data 408, the text data 414, and/or the motion data 412 when motion is detected (e.g., in the message 416), in other examples the data may be generated and/or transmitted at other times. For example, the image data 406, the audio data 408, the text data 414, and/or the motion data 412 may be generated and transmitted continuously (e.g., in a streaming manner), periodically, upon request, etc. In examples where the image data 406, the audio data 408, the text data 414, and/or the motion data 412 may be generated and transmitted continuously, the detection of motion (e.g., a motion event) may cause an indication of when the motion was detected (e.g., a time stamp) and/or how long the motion was detected for (e.g., a duration) to be associated with the image data 406, the audio data 408, the text data 414, and/or the motion data 412. As a result, even though the image data 406, the audio data 408, the text data 414, and/or the motion data 412 may be continuously generated by the A/V device 210, the image data 406, the audio data 408, the text data 414, and/or the motion data 412 associated with motion events may be tagged and/or stored separately (e.g., similar to that of the image data 406, the audio data 408, the text data 414, and/or the motion data 412 generated in response to the detection of motion), from the image data 406, the audio data 408, the text data 414, and/or the motion data 412 that is not associated with motion events.

As described herein, at least some of the processes of the backend server 224, the hub device 202, and/or the client device 214, 216 may be executed by the A/V device 210.

The A/V device 210 may be configured to include components and/or functionality similar to the electronic device 102 of FIG. 1A and/or the electronic device 902 of FIG. 1E, and vice versa. For example, the electronic device 102 and/or the electronic device 902 may include similar components and/or functionality to the A/V devices 210. The device application 404 may thus include one or both of a communication analyzer 420, such as the communication analyzer 116, and a communication monitor 421, such as the communication monitor 916. Similarly, the memory 402 may store one or more of a WLAN configuration 422 with a WLAN password 424 that may represent the WLAN configuration 114 and WLAN password 115, respectively, and the message 426 with the instruction 428 may represent the message 118 with the instruction 119, respectively, of FIG. 1A. A cause 430 may similarly represent the cause 117, a repeater WLAN configuration 432 may be similar to the repeater WLAN configuration 914, and a base WLAN configuration 434 may be similar to the base WLAN configuration 915.

Figure 5:
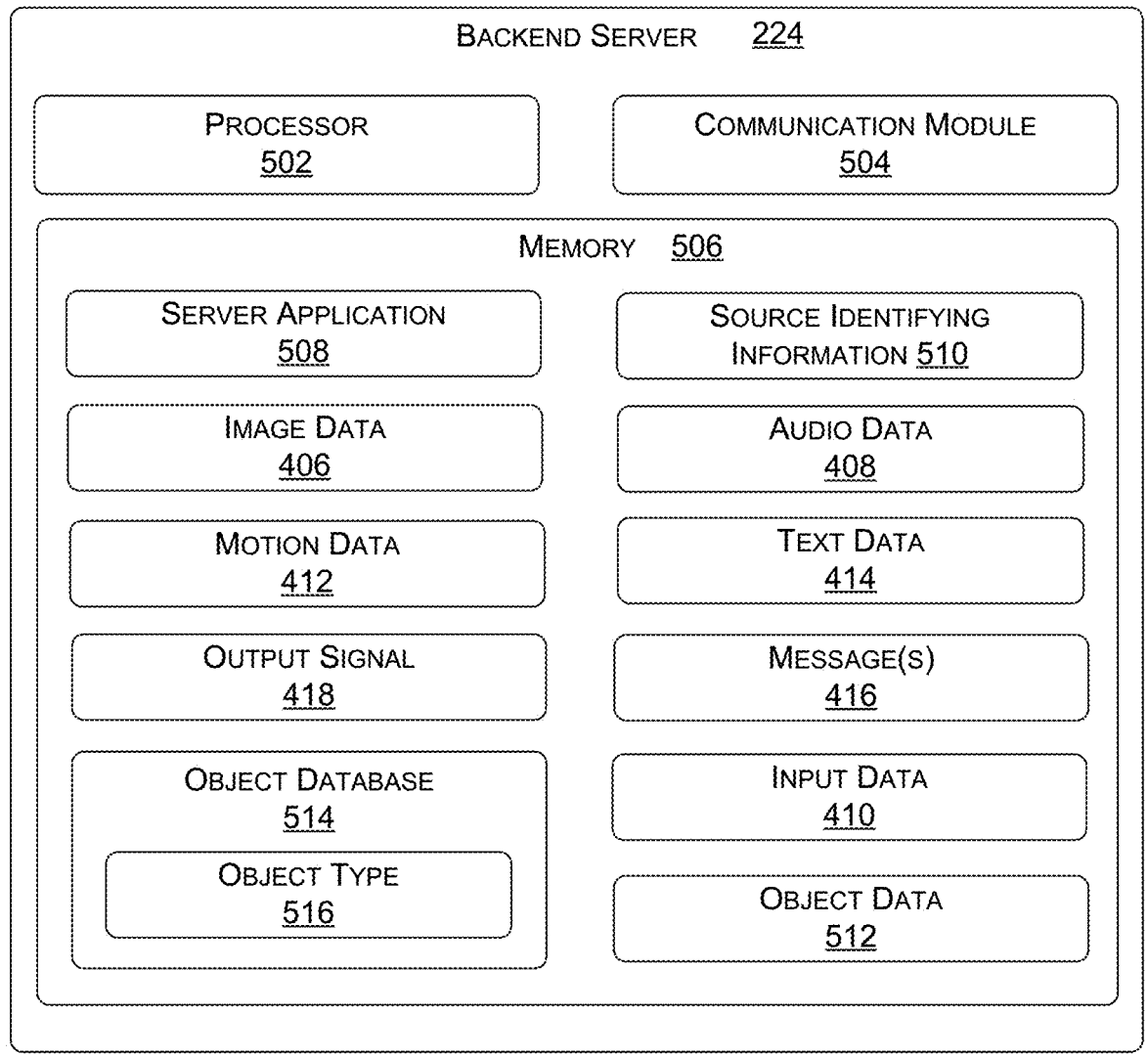
FIG. 5 is a functional block diagram illustrating one example embodiment of a backend device according to various aspects of the present disclosure.

FIG. 5 is a functional block diagram illustrating one embodiment of the backend server 224 according to various aspects of the present disclosure. The backend server 224 may comprise processor(s) 502 (which may be similar to, and/or include similar functionality as, the processor(s) 310), a communication module 504 (which may be similar to, and/or include similar functionality as, the communication module 312), and a memory 506 (which may be similar to, and/or include similar functionality as, the memory 402). The communication module 504 may allow the backend server 224 to access and communicate with devices connected to the network (Internet/PSTN) 212 (e.g., the A/V device 210, the hub device 202, the client devices 214, 216, and/or a device controlled by the security monitoring service 228).

The memory 402 may include a server application 508 that configures the processor(s) 502 to receive and/or retrieve the audio data 408, the text data 414, the input data 410, the messages 416, the image data 406, and/or the motion data 412 from the A/V device 210 (e.g., in the output signal 418) and/or the hub device 202. The server application 508 may also configure the processor(s) 502 to transmit (and/or forward) the audio data 408, the text data 414, the input data 410, the messages 416, the image data 406, and/or the motion data 412 to the client devices 214, 216 using the communication module 504. Furthermore, the server application 508 may configure the processor(s) 502 to receive, using the communication module 504, image data 512 (also referred to as "second image data 512") generated by the A/V devices 210.

Although referred to as the backend server 224 with reference to the processes described herein, the backend server 224 may additionally, or alternatively, include one or more of the devices from the network(s) of servers/backend devices 220. For example, the processes described herein with respect to the backend server 224 may additionally, or alternatively, at least in part, be performed by one or more backend APIs 226.

In further reference to FIG. 5, the memory 506 may also include source identifying data 510 that may be used to identify the A/V device 210, the hub device 202, and/or the client devices 214, 216. In addition, the source identifying data 510 may be used by the processor(s) 502 of the backend server 224 to determine the client devices 214, 216 are associated with the A/V device 210 and/or the hub device 202.

In some embodiments, the server application 508 may further configure the processor(s) 502 to generate and transmit a report signal (not shown) to a third-party client device (e.g., electronic device(s) 234), which may be associated with a law enforcement agency or the security monitoring service 228, for example. The report signal, which may be the message 416, in some examples, may include the image data 406, the audio data 408, the text data 414, and/or the second image data 512.

As described herein, at least some of the processes of the A/V device 210, the hub device 202, and/or the client device 214, 216 may be executed by the backend server 224.

Although described as being performed in the backend server 224, in some embodiments, the image data 406 may be analyzed by any of the A/V recording and communication device 210, the hub device 202, and/or the client device 214/216, in order to determine if the image data 406 depicts an object, therein. Thus, any or all of the operations described herein to analyze the image data 406 may be performed by any of these devices. To perform these operations, any or all of these devices may also include the object database 514, including the object type 516, and/or the object data 514, as described with reference to FIG. 5.

The hub device 202 and/or the backend server 224 (and/or one or more additional or alternative components of the network(s) of servers/backend devices 220) may alternatively be referred to herein as "network devices."

Figure 6:
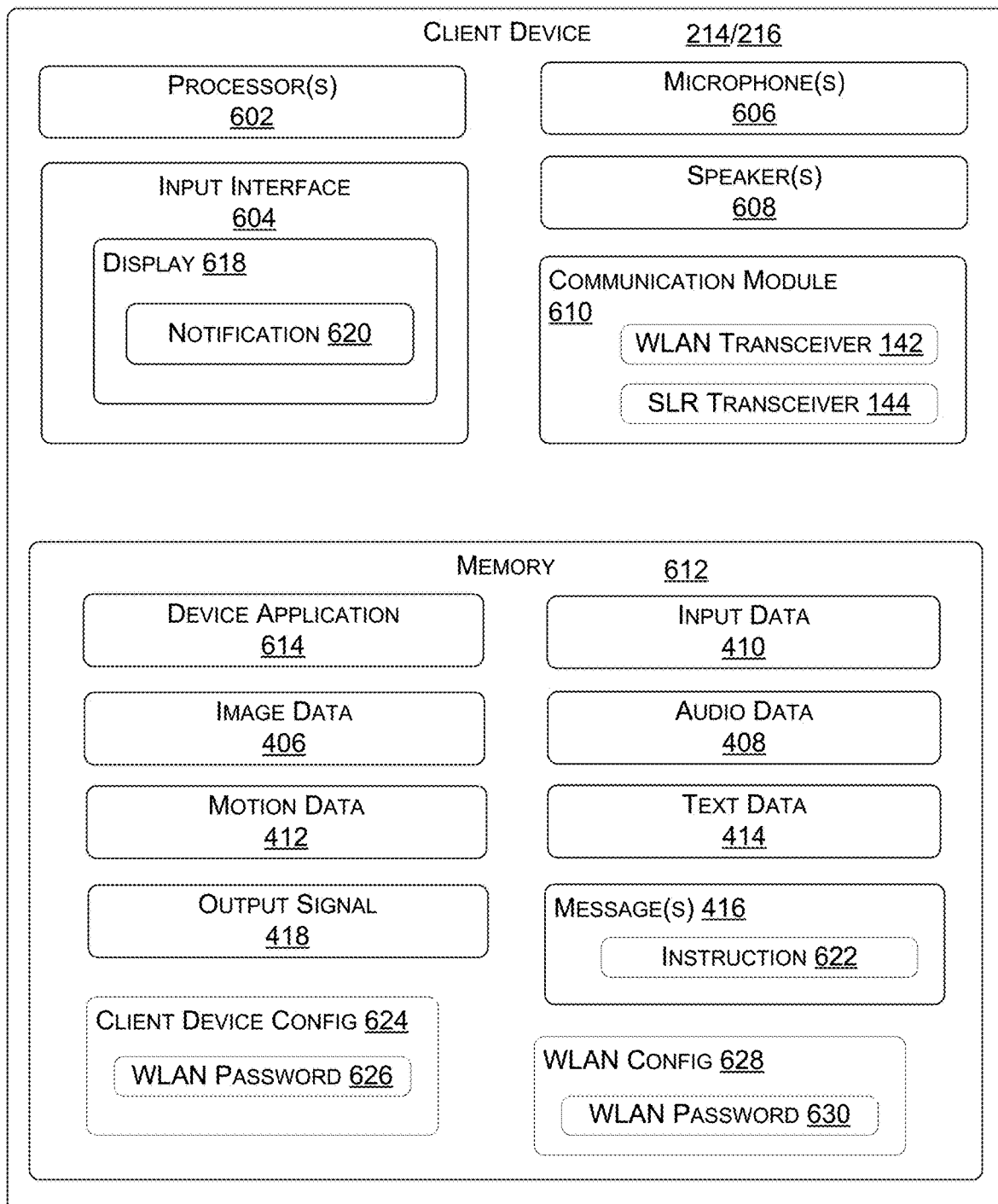
FIG. 6 is a functional block diagram illustrating one example embodiment of a client device according to various aspects of the present disclosure.

Now referring to FIG. 6, FIG. 6 is a functional block diagram illustrating one embodiment of the client device 214, 216, according to various aspects of the present disclosure. The client device 214, 216 may comprise processor(s) 602 (which may be similar to, and/or include similar functionality as, the processor(s) 310) that are operatively connected to an input interface 604, microphone(s) 606, speaker(s) 608, a communication module 610 (which may be similar to, and/or include similar functionality as, the communication module 312), and memory 612 (which may be similar to, and/or include similar functionality as, the memory 402). The client device 214, 216 may further comprise a camera (not shown) operatively connected to the processor(s) 602.

The memory 612 may store a device application 614. In various embodiments, the device application 614 may configure the processor(s) 602 to receive input(s) to the input interface 604 (e.g., to initiate auto-provisioning as described with reference to FIG. 1E). In addition, the device application 614 may configure the processor(s) 602 to receive, using the communication module 610, the input data 410, the image data 406, the audio data 408, the output signal 418, and/or messages 416 from one or more of the A/V device 210, the hub device 202, or the backend server 224.

With further reference to FIG. 6, the input interface 604 may include a display 618. The display 618 may include a touchscreen, such that the user of the client device 214, 216 may provide inputs directly to the display 618. In some embodiments, the client device 214, 216 may not include a touchscreen. In such embodiments, and in embodiments where the client device 214, 216 includes the touchscreen, the user may provide an input using any input device, such as, without limitation, a mouse, a trackball, a touchpad, a joystick, a pointing stick, a stylus, etc.

In some of the present embodiments, in response to receiving a message 416, the device application 614 may configure the processor(s) 602 to cause the display 618 to display the message 416. The message 416 may indicate that the A/V device 210 detected motion, detected the presence of an object, received an input (e.g., to the button 306), etc. While displaying the message 416, the input interface 604 may receive input from the user to answer the message 416. In response, the device application 614 may configure the processor(s) 602 to display the received image data 406 on the display 618 (e.g., display image(s) and/or video footage represented by the image data 406).

As described herein, at least some of the processes of the A/V device 210, the hub device 202, and/or the backend server 224 may be executed by the client device 214, 216.

The client device 214/216 may be configured to include components and/or functionality similar to the client device 130 of FIGS. 1A and 1B and/or the client device 930 of FIG. 1E, and vice versa. The message(s) 416 may include an instruction 622, similar to the message 118 and the instruction 119 of FIG. 1B, that cause a notification 620, similar to the notification 134, to be displayed on the display 618. The device application 614 may include functionality similar to the application 132 and the memory 612 may store one or more of a client device configuration 624 with a WLAN password 626 that is similar to the client device configuration 148 and the WLAN password 150 and a WLAN configuration 628 with a WLAN password 630, that is similar to the WLAN configuration 114 and the WLAN password 115.

Each of the processes described herein, including the method 160 and 180 of FIGS. 1C and 1D, are illustrated as a collection of blocks in a logical flow graph, which represent a sequence of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks may be combined in any order and/or in parallel to implement the processes. Additionally, any number of the described blocks may be optional and eliminated to implement the processes.

One aspect of the present embodiments includes the realization that an electronic device 102 may be configured, using a short-link radio 128, to connect to a WLAN 120, and that the electronic device 102 may thereafter disable the short-link radio 128 and rely upon the WLAN 120 for communication. However, when the WLAN 120 is unavailable, the electronic device 102 often becomes communicatively isolated and unable to report the connectivity problem. The present embodiments solve this problem by detecting when communication over the WLAN 120 is unavailable, re-enabling the short-link radio 128, and sending a message 118 indicating the communication problem to a client device 130 when it is in range of the electronic device 102. Advantageously, this process of re-enabling the short-range radio 128 further enables the client device 130, when informed of the communication problem, to evaluate the WLAN 120 and automatically correct the communication problem, such as when the WLAN password 115 used by the electronic device 102 is not accepted by the WLAN 120.

Another aspect of the present embodiments includes the realization that when the electronic device 102 is unable to communicate via the WLAN 120, the communication problem may remain unnoticed. The present embodiments solve this problem by informing the client device 130 of the communication problem at the earliest opportunity when the client device 130 comes into range of the short-link radio 128. Advantageously, this process of re-enabling the short-range radio 128 further enables the client device 130 to notify the user of the client device 130 that a communication problem exists, such that the user may remedy the problem.

Another aspect of the present embodiments includes the realization that when an electronic device 902 is auto-provisioned from a repeater AP 923, the electronic device 902 is configured to only access the repeater WLAN 921 (e.g., the WLAN supported by the repeater AP 923). Thus when the repeater AP 923 fails (e.g., gets unplugged), the electronic device 902 is unable to connect to the repeater WLAN 921, and thus loses connectivity to a remote server 926 via the Internet for example. The present embodiments solve this problem by configuring the electronic device 902 with both a repeater WLAN configuration 914 and a base WLAN configuration 915, during auto-provisioning, where the base WLAN configuration 915 defines access requirements for a base WLAN 920 to which the repeater AP 923 connects and "extends". The electronic device 902 may be configured with a communication monitor 916 that detects when the repeater WLAN 921 is unavailable, and automatically configures the electronic device 902 to connect to the base WLAN 920 using the base WLAN configuration 915. Advantageously, when the repeater WLAN 921 fails (e.g., when the repeater AP 923 is unplugged), the electronic device 902 may automatically connect to the base WLAN 920 and thereby maintain connectivity to the remote server 926 via the Internet. A further advantage of this aspect is that when the repeater WLAN 921 recovers (e.g., when the repeater AP is plugged back in), the electronic device 902 may automatically reconnect to the repeater WLAN 921.

In a first aspect, a method provides a notification of a connectivity problem of a video doorbell to a smartphone. The method includes: determining that a first communication link between the video doorbell and a backend server is unavailable; determining that a password used by the video doorbell to access a local area network (LAN) is not accepted by the LAN; activating a Bluetooth transceiver of the video doorbell; detecting a Bluetooth signal transmitted from the smartphone; establishing a second communication link between the video doorbell and the smartphone via the Bluetooth transceiver; and sending a message, to the smartphone via the Bluetooth transceiver, indicating that the password used by the video doorbell to access the LAN is not accepted by the LAN, the message causing an application running on the smartphone to display a notification on a display of the smartphone indicating that the password used by the video doorbell to access the LAN is not accepted by the LAN.

Certain embodiments of the first aspect further include receiving, via the Bluetooth transceiver, a valid password of the LAN from the application running on the smartphone; storing the valid password in a memory of the video doorbell; connecting to the LAN using the valid password; and deactivating the Bluetooth transceiver.

In a second aspect, a method indicates unavailability of a communication link between a first electronic device and a second electronic device. The method includes: detecting, by the first electronic device, that the communication link with the second electronic device is unavailable; activating a short-link radio at the first electronic device; and transmitting a message, via the short-link radio, indicating that the communication link with the second electronic device is unavailable.

In certain embodiments of the second aspect, the message further indicates a cause of the unavailable communication link.

In certain embodiments of the second aspect, the message includes an instruction for an application running on a mobile device to display a notification of the unavailable communication link.

Certain embodiments of the second aspect further include determining that a network password is invalid, wherein the message includes an instruction for an application running on a mobile device to display a notification of the invalid network password.

Certain embodiments of the second aspect further include receiving, via the short-link radio, a valid network password.

Certain embodiments of the second aspect further include determining that an acknowledgement for a transmission was not received, wherein the message includes an instruction for an application running on a mobile device to display a notification of the acknowledgement not being received.

Certain embodiments of the second aspect further include: pairing the first electronic device with a mobile device using the short-link radio; and receiving parameters from the mobile device for connecting to a network.

In certain embodiments of the second aspect, the first electronic device uses one or more of IEEE 802.11, SigFox, LoRaWAN, and LTE.

In certain embodiments of the second aspect, the short-link radio uses one or more of Bluetooth, BLE, ZibBee, Z-wave, Ant, and Ant+.

In a third aspect, a method provides a notification of a network communication problem with an electronic device. The method includes: connecting, by a mobile device, to the electronic device using a short-link radio protocol; receiving a fault indication at the mobile device via (a) the short-link radio protocol and (b) an application running on the mobile device; and displaying a notification about the fault indication on the mobile device.

In certain embodiments of the third aspect, the fault indication defines one or more of a network connectivity problem, an invalid network password problem, and a missing acknowledgement from remote server problem.

In certain embodiments of the third aspect, the fault indication indicates the network connectivity problem or the invalid network password problem, the method further includes: determining that the mobile device can connect to the network; and sending configuration parameters of the network to the electronic device via the short-link radio protocol.

In certain embodiments of the third aspect, the fault indication indicates the missing acknowledgement from remote server problem, the method further including: determining that the Internet is not accessible via the network; and displaying the notification to indicate that the network is not connected to the Internet.

In certain embodiments of the third aspect, the short-link radio protocol is one or more of Bluetooth, BLE, ZibBee, Z-wave, Ant, and Ant+.

In certain embodiments of the third aspect, the mobile device uses one or more of IEEE 802.11, SigFox, LoRaWAN, and LTE.

Figure 7:
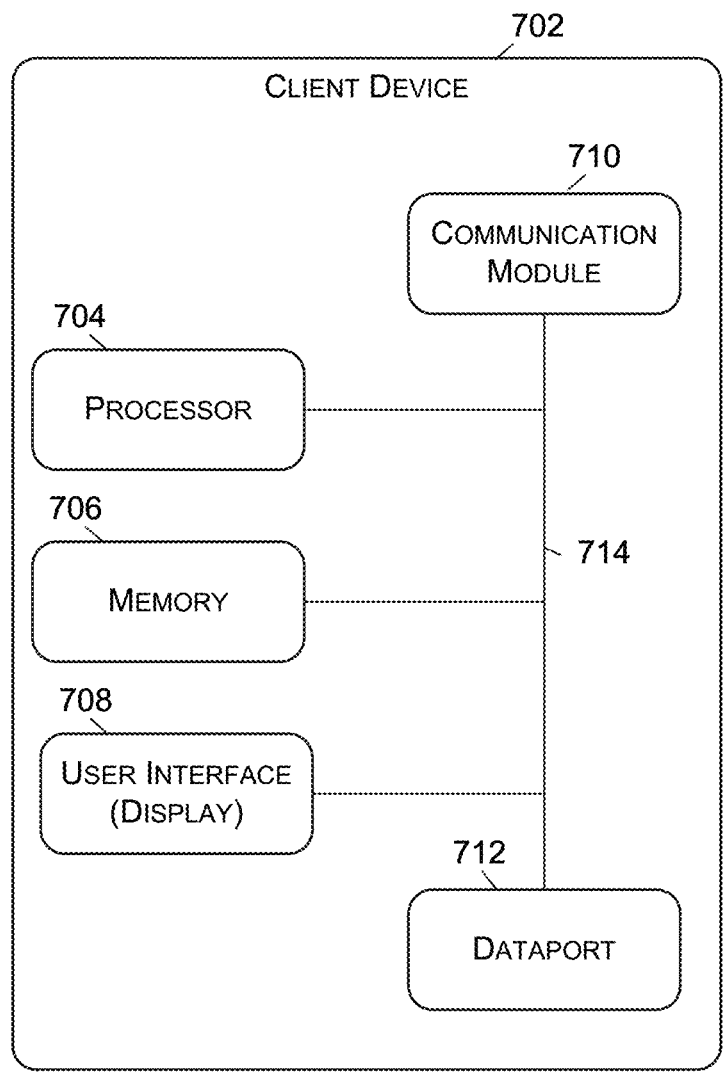
FIG. 7 is a functional block diagram of a client device on which the present embodiments may be implemented according to various aspects of the present disclosure.

FIG. 7 is a functional block diagram of a client device 702 on which the present embodiments may be implemented according to various aspects of the present disclosure. The client device(s) 214, 216 described with reference to FIG. 2 may include some or all of the components and/or functionality of the client device 702. The client device 702 may comprise, for example, a smartphone. The client device 130 of FIG. 1A and/or the client device 930 of the FIG. 1E may include similar components and/or functionality to the client device 702. The client device 702 may include similar components and/or functionality to the client devices 130 and/or 930.

With reference to FIG. 7, the client device 702 includes a processor 704, a memory 706, a user interface 708, a communication module 710, and a dataport 712. These components are communicatively coupled together by an interconnect bus 714. The processor 704 may include any processor used in smartphones and/or portable computing devices, such as an ARM processor (a processor based on the RISC (reduced instruction set computer) architecture developed by Advanced RISC Machines (ARM).). In some embodiments, the processor 2004 may include one or more other processors, such as one or more conventional microprocessors, and/or one or more supplementary co-processors, such as math co-processors.

The memory 706 may include both operating memory, such as random-access memory (RAM), as well as data storage, such as read-only memory (ROM), hard drives, flash memory, or any other suitable memory/storage element. The memory 706 may include removable memory elements, such as a CompactFlash card, a MultiMediaCard (MMC), and/or a Secure Digital (SD) card. In some embodiments, the memory 2006 may comprise a combination of magnetic, optical, and/or semiconductor memory, and may include, for example, RAM, ROM, flash drive, and/or a hard disk or drive. The processor 704 and the memory 706 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 704 may be connected to the memory 706 via the dataport 712.

The user interface 708 may include any user interface or presentation elements suitable for a smartphone and/or a portable computing device, such as a keypad, a display screen, a touchscreen, a microphone, and a speaker. The communication module 710 is configured to handle communication links between the client device 702 and other, external devices or receivers, and to route incoming/outgoing data appropriately. For example, inbound data from the dataport 712 may be routed through the communication module 710 before being directed to the processor 704, and outbound data from the processor 704 may be routed through the communication module 710 before being directed to the dataport 712. The communication module 710 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 712 may be any type of connector used for physically interfacing with a smartphone and/or a portable computing device, such as a mini-USB port or an IPHONE®/IPOD® 30-pin connector or LIGHTNING® connector. In other embodiments, the dataport 712 may include multiple communication channels for simultaneous communication with, for example, other processors, servers, and/or client terminals.

The memory 706 may store instructions for communicating with other systems, such as a computer. The memory 706 may store, for example, a program (e.g., computer program code) adapted to direct the processor 704 in accordance with the present embodiments. The instructions also may include program elements, such as an operating system. While execution of sequences of instructions in the program causes the processor 704 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 8:
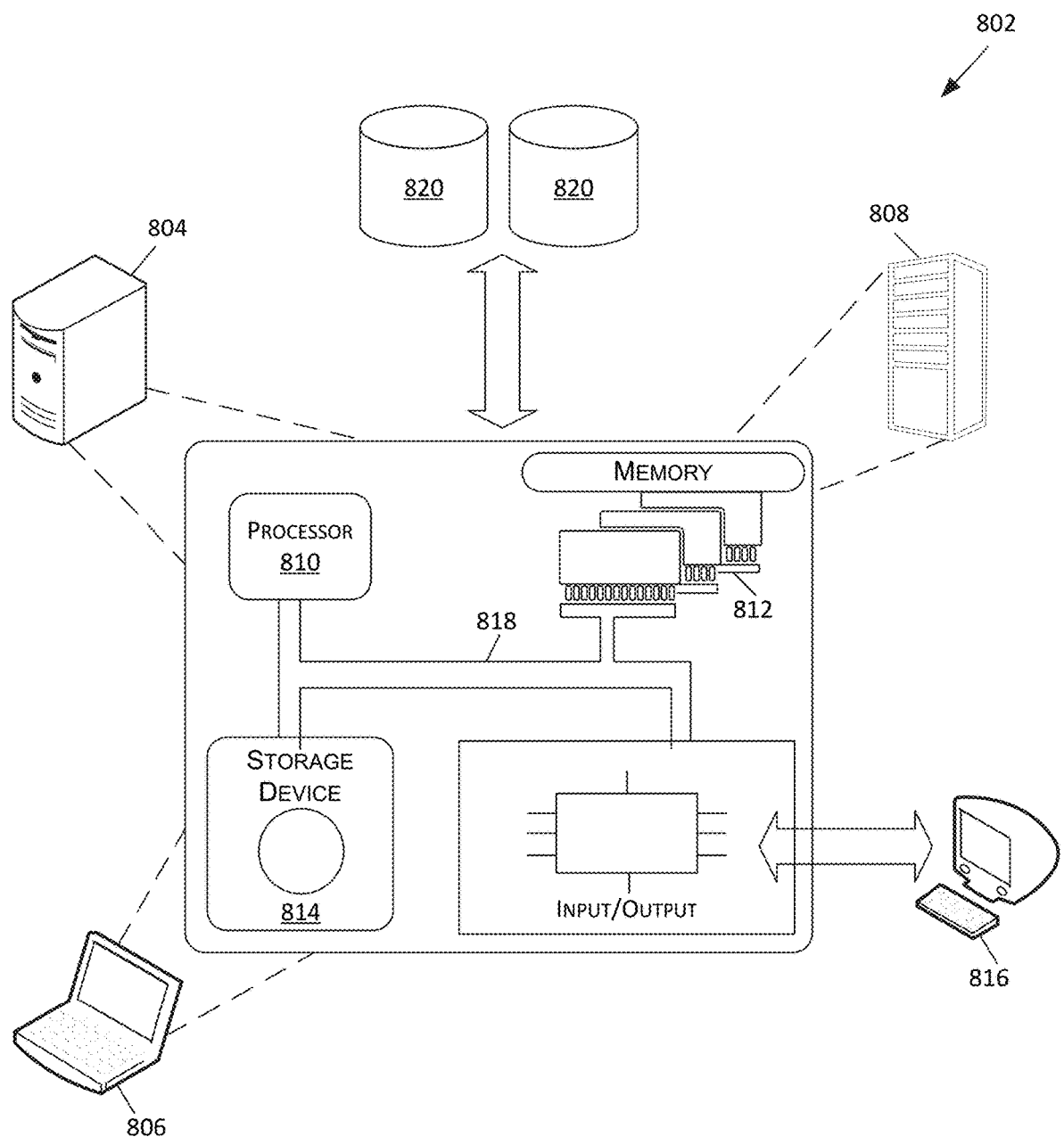
FIG. 8 is a functional block diagram of a general-purpose computing system on which the present embodiments may be implemented according to various aspects of present disclosure.

FIG. 8 is a functional block diagram of a general-purpose computing system on which the present embodiments may be implemented according to various aspects of the present disclosure. The computer system 802 may be embodied in at least one of a personal computer (also referred to as a desktop computer) 804, a portable computer (also referred to as a laptop or notebook computer) 806, and/or a server 808 is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 802 may execute at least some of the operations described above. The computer system 802 may include at least one processor 810, memory 812, at least one storage device 814, and input/output (I/O) devices 816. Some or all of the components 810, 8 12, 814, 816 may be interconnected via a system bus 818. The processor 810 may be single- or multi-threaded and may have one or more cores. The processor 810 execute instructions, such as those stored in the memory 812 and/or in the storage device 814. Information may be received and output using one or more I/O devices 816.

The memory 812 may store information, and may be a computer-readable medium, such as volatile or non-volatile memory. The storage device(s) 814 may provide storage for the system 802 and, in some embodiments, may be a computer-readable medium. In various aspects, the storage device(s) 814 may be a flash memory device, a hard disk device, an optical disk device, a tape device, or any other type of storage device.

The I/O devices 816 may provide input/output operations for the system 802. The I/O devices 816 may include a keyboard, a pointing device, and/or a microphone. The I/O devices 816 may further include a display unit for displaying graphical user interfaces, a speaker, and/or a printer. External data may be stored in one or more accessible external databases 820.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random-access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

As used herein, the phrases "at least one of A, B and C," "at least one of A, B, or C," and "A, B, and/or C" are synonymous and mean logical "OR" in the computer science sense. Thus, each of the foregoing phrases should be understood to read on (A), (B), (C), (A and B), (A and C), (B and C), and (A and B and C), where A, B, and C are variables representing elements or features of the claim. Also, while these examples are described with three variables (A, B, C) for ease of understanding, the same interpretation applies to similar phrases in these formats with any number of two or more variables.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A method for providing a video doorbell connectivity notification to a smartphone, the method comprising:
   determining that a first communication link between the video doorbell and a backend server is unavailable;
   determining that a password used by the video doorbell to access a local area network (LAN) is not accepted by the LAN;
   activating a Bluetooth transceiver of the video doorbell;
   detecting a Bluetooth signal transmitted from the smartphone;
   establishing a second communication link between the video doorbell and the smartphone via the Bluetooth transceiver; and
   sending a message, to the smartphone via the Bluetooth transceiver, indicating that the password used by the video doorbell to access the LAN is not accepted by the LAN, the message causing an application running on the smartphone to display a notification on a display of the smartphone indicating that the password used by the video doorbell to access the LAN is not accepted by the LAN.

2. The method of claim 1, further comprising:
   receiving, via the Bluetooth transceiver, a valid password of the LAN from the application running on the smartphone;
   storing the valid password in a memory of the video doorbell;
   connecting to the LAN using the valid password; and
   deactivating the Bluetooth transceiver.

3. A method for indicating unavailable communication between a first electronic device and a second electronic device, the method comprising:
   detecting, by the first electronic device, that the communication link with the second electronic device is unavailable;
   activating a short-link radio at the first electronic device; and
   transmitting a message, via the short-link radio, indicating that the communication link with the second electronic device is unavailable.

4. The method of claim 3, wherein the message further indicates a cause of the unavailable communication link.

5. The method of claim 4, wherein the message includes an instruction for an application running on a mobile device to display a notification of the unavailable communication link.

6. The method of claim 4, further comprising:
   determining that a network password is invalid, wherein the message includes an instruction for an application running on a mobile device to display a notification of the invalid network password.

7. The method of claim 6, further comprising receiving, via the short-link radio, a valid network password.

8. The method of claim 4, further comprising:
   determining that an acknowledgement for a transmission was not received, wherein the message includes an instruction for an application running on a mobile device to display a notification of the acknowledgement not being received.

9. The method of claim 3, further comprising:
   pairing the first electronic device with a mobile device using the short-link radio; and
   receiving parameters from the mobile device for connecting to a network.

10. The method of claim 9, wherein the first electronic device uses one or more of IEEE 802.11, SigFox, LoRaWAN, and LTE.

11. The method of claim 3, wherein the short-link radio uses one or more of Bluetooth, BLE, ZibBee, Z-wave, Ant, and Ant+.

12. A method for providing an electronic device communication notification, comprising:
   connecting, by a mobile device, to the electronic device using a short-link radio protocol;
   receiving a fault indication at the mobile device via (a) the short-link radio protocol and (b) an application running on the mobile device, wherein the fault indication defines one or more of a network connectivity problem, an invalid network password problem, and a missing acknowledgement from remote server problem; and
   displaying a notification about the fault indication on the mobile device;

when the fault indication indicates the network connectivity problem or the invalid network password problem, determining that the mobile device can connect to the network, and sending configuration parameters of the network to the electronic device via the short-link radio protocol.

13. The method of claim 12, further comprising, when the fault indication indicates the missing acknowledgement from remote server problem, determining that the Internet is not accessible via the network, and displaying the notification to indicate that the network is not connected to the Internet.

14. The method of claim 12, wherein the short-link radio protocol is one or more of Bluetooth, BLE, ZibBee, Z-wave, Ant, and Ant+.

15. The method of claim 12, wherein the mobile device uses one or more of IEEE 802.11, SigFox, LoRaWAN, and LTE.

* * * * *